United States Patent

Okinaka et al.

(10) Patent No.: US 6,720,094 B2
(45) Date of Patent: Apr. 13, 2004

(54) SECONDARY AGGLOMERATES OF MAGNETIC METAL PARTICLES FOR MAGNETIC RECORDING AND PROCESS FOR PRODUCING THE SAME

(75) Inventors: Kenji Okinaka, Ube (JP); Masayuki Uegami, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 266 days.

(21) Appl. No.: 09/878,184

(22) Filed: Jun. 12, 2001

(65) Prior Publication Data

US 2002/0022152 A1 Feb. 21, 2002

(30) Foreign Application Priority Data

Jun. 13, 2000 (JP) .................................... 2000-177377
Aug. 7, 2000 (JP) .................................... 2000-238373
Oct. 6, 2000 (JP) .................................... 2000-308383

(51) Int. Cl.[7] ................................................ G11B 5/66
(52) U.S. Cl. .............................. 428/694 BA; 428/332; 428/323; 428/357; 428/402; 75/300; 252/62.51 R; 252/62.56; 148/105
(58) Field of Search .................... 428/694 BA, 332, 428/323, 357, 402; 75/300; 252/62.51 R, 62.56; 148/105

(56) References Cited

U.S. PATENT DOCUMENTS

| | | |
|---|---|---|
| 4,470,844 A | 9/1984 | Rademachers et al. |
| 5,580,399 A | 12/1996 | Tamai et al. |
| 5,652,060 A * | 7/1997 | Uchida et al. ............... 428/404 |
| 6,048,412 A | 4/2000 | Kurokawa et al. |
| 6,183,868 B1 | 2/2001 | Kurokawa et al. |

FOREIGN PATENT DOCUMENTS

| | | |
|---|---|---|
| DE | 37 02 161 | 8/1987 |
| DE | 197 17 560 | 10/1997 |
| EP | 0 054 818 | 12/1981 |
| EP | 0 125 150 | 5/1984 |
| EP | 0 673 987 | 3/1995 |
| EP | 0 940 369 | 9/1999 |
| JP | 3-276423 | 12/1991 |
| WO | WO 97/20681 | 6/1997 |

* cited by examiner

Primary Examiner—Deborah Jones
Assistant Examiner—Vivek Koppikar
(74) Attorney, Agent, or Firm—Nixon & Vanderhye P.C.

(57) ABSTRACT

Secondary agglomerates of magnetic metal particles containing primary particles having an average major axial diameter of 0.05 to 0.25 μm, said secondary agglomerates having an average particle diameter of 300 to 800 μm, an upper limit of particle diameter of 2,000 μm and a repose angle of 38 to 45°. The secondary agglomerates exhibit not only excellent handing property due to high storage efficiency, high transport efficiency and good flowability thereof, but also excellent kneading property when kneaded with various binder resins and organic solvents in a kneader, and excellent dilution-dispersibility when diluted with an additional amount of the organic solvent, upon the production of coating-type magnetic recording media, so as to more improve a surface smoothness and squareness of a magnetic coating film obtained therefrom, and a process for producing such secondary agglomerates of magnetic metal particles for magnetic recording.

10 Claims, 2 Drawing Sheets

SECONDARY AGGLOMERATES OF MAGNETIC METAL PARTICLES FOR MAGNETIC RECORDING AND PROCESS FOR PRODUCING THE SAME

BACKGROUND OF THE INVENTION

The present invention relates to secondary agglomerates of magnetic metal particles for magnetic recording and a process for producing the same, and more particularly, to secondary agglomerates of magnetic metal particles for magnetic recording, which exhibit not only excellent handing property due to high storage efficiency, high transport efficiency and good flowability thereof, but also excellent kneading property when kneaded with various binder resins and organic solvents in a kneader, and excellent dilution-dispersibility when diluted with an additional amount of the organic solvent, upon the production of coating-type magnetic recording media, so as to more improve a surface smoothness and squareness of a magnetic coating film obtained therefrom, and a process for producing such secondary agglomerates of magnetic metal particles for magnetic recording.

In recent years, recording-time prolongation, miniaturization and lightening of audio, video or computer magnetic recording and reproducing apparatuses for various magnetic recording media such as digital audio tapes (DAT) for people's livelihood use, 8-mm video tapes, Hi-8 tapes, VTR tapes for business use, computer tapes or discs thereof have proceeded more rapidly. In particular, VTRs (video tape recorders) are now widespread, so that there have been intensely developed VTRs aiming at the transfer of analog recording types into digital ones in addition to the above recording-time prolongation, miniaturization and lightening thereof. On the other hand, with such recent tendencies, the magnetic recording media have been required to have high image quality and high output characteristics, especially high frequency characteristics. To meet these requirements, it is necessary to reduce noise due to the magnetic recording media themselves and enhance residual magnetic flux density, coercive force, dispersibility, filling property and tape-surface smoothness thereof. Therefore, it ha been further required to improve S/N ratio of the magnetic recording media.

These properties of the magnetic recording media have a close relation to magnetic particles used therein. In recent years, magnetic metal particles have been noticed because such particles can show a higher coercive force and a larger saturation magnetization as compared to those of conventional magnetic iron oxide particles, and have been already used as magnetic particles for magnetic recording media such as DAT, 8-mm video tapes, Hi-8 tapes, video tapes for business use, computer tapes or discs. The magnetic metal particles containing iron as a main component conventionally used in DAT, 8-mm video tapes, Hi-8 tapes or the like have been required to be further improved in output characteristics and weather resistance. In addition, the magnetic metal particles must fulfill applicability to existing format and good economy at the same time. Therefore, it has been strongly required to provide magnetic metal particles capable of satisfying the above requirements while minimizing amounts of various metals added thereto.

Various properties of coating-type magnetic recording media are detailed below.

In order to obtain high image quality in video magnetic recording media, it has been required to enhance S/N ratio and video frequency characteristics thereof. For this reason, it is important to improve a surface smoothness of the magnetic recording media. For improving the surface smoothness, it is also required to improve a dispersibility of magnetic particles in coating composition as well as orientation and filling properties thereof in coating film. In addition, in order to enhance the video frequency characteristics, the magnetic recording media have been required to exhibit not only a high coercive force and a large residual magnetic flux density, but also an excellent S.F.D. (Switching Field Distribution), i.e., a small coercive force distribution.

As known in the arts, the magnetic metal particles are produced by granulating as a starting material goethite particles, hematite particles obtained by heat-dehydrating the goethite particles, or particles obtained by incorporating metal elements other than iron into the above goethite or hematite particles, to form a granulated product having an appropriate size; and then heat-reducing the resultant granulated product. In this case, it is important to appropriately control the shape and size of the goethite particles as a starting material, and prevent occurrence of heat fusion between particles as well as deformation and shape breakage of each particle upon heat-treatments such as heat-dehydration and heat-reduction.

In general, the granulated product of magnetic metal particles is directly charged into a kneader and kneaded therein with various binder resins and organic solvents.

More specifically, in the production of coating-type magnetic recording media, after the granulated product of magnetic metal particles is kneaded with various binder resins and organic solvents in the kneader, the obtained kneaded material is mixed and diluted with an additional amount of the organic solvent and the obtained magnetic coating composition is coated on a non-magnetic substrate. As described above, since the dispersibility of the magnetic metal particles influences the surface smoothness of the magnetic coating film obtained therefrom, the poorer the dispersibility of the magnetic metal particles, the lower the squareness of the magnetic coating film. Therefore, it has been strongly required that the magnetic metal particles have an excellent dispersibility, and the granulated product of magnetic metal particles is readily deaggregated into the magnetic metal particles as primary particles.

On the other hand, it is preferred that the granulated product of magnetic metal particles has a bulk density as large as possible. This is because when the granulated product is filled in a container for temporary storage in warehouse or transport thereof, the size of the container used therefor can be reduced, thereby saving the storage space and reducing the transport cost. However, in general, particles having a large bulk density exhibit a deteriorated flowability, thereby causing such a clogging or bridging phenomenon that the discharge of the particles from an outlet of storage or transport container or receptacle is completely disturbed or frequently interrupted even though the outlet diameter is far larger than the size of the particles, i.e., causing considerable deterioration in handling property of the particles. Therefore, it has been strongly required to provide granulated product having an appropriate flowability in addition to other good properties.

It is generally known that the flowability of the granulated product varies depending upon particle diameter, particle density, particle shape and surface property thereof. Therefore, the present inventors' attention has been paid to the particle diameter and particle density.

As conventional techniques for improving magnetic properties, dispersibility, flowability, keeping properties or the like of magnetic particles for magnetic recording media, there are known those described in Japanese Patent Application Laid-Open (KOKAI) Nos. 62-275028(1987), 63-88807(1988) and 3-276423(1991), Japanese Patent Publication (KOKOKU) Nos. 1-52442(1989), 4-70363(1992) and 7-62900(1995), Japanese Patent Application Laid-Open (KOKAI) No. 8-172005(1996) or the like.

At present, it has been strongly required to provide granulated product of magnetic metal particles which can exhibit not only excellent kneading property when kneaded with various binder resins and organic solvents and excellent dilution-dispersibility when diluted with an additional amount of the organic solvent, upon the production of coating-type magnetic recording media, but also high storage efficiency and high transport efficiency as well as good flowability. However, such granulated product of magnetic metal particles cannot be obtained yet.

Namely, in Japanese Patent Application Laid-Open (KOKAI) No. 62-275028(1987), although there is described the method of producing cobalt-containing spherical ferromagnetic iron oxide particles having a particle diameter of 5 to 200 µm by spray-drying for the purpose of obtaining magnetic particles having an excellent dispersibility, it is difficult to directly apply this method to the production of granulated product of magnetic metal particles. This is because the material to be treated is cobalt-containing ferromagnetic iron oxide quite different from the granulated product, and the method is concerned with drying (spray-drying) method which is inherently required when such particles are recovered from water slurry after adhering Co thereto. When the magnetic metal particles are treated in the form of water slurry, there tend to arise problems such as deteriorated magnetic properties due to oxidation in the aqueous system or upon drying.

In Japanese Patent Application Laid-Open (KOKAI) No. 63-88807(1988), although there is described the method of producing magnetic particles by finely pulverizing baked particles, granulating the finely pulverized particles using water as a binder, drying and then reducing the granulated product for the purpose of increasing the density of the magnetic particles and shortening the time required for dispersing the particles in a magnetic coating composition simultaneously, the diameter of the granulated product optimum for kneading upon the production of magnetic coating composition and flowability of these particles are not specified at all. Therefore, this method fails to provide a granulated product of magnetic metal particles having sufficient dispersibility and handling property in the magnetic coating composition.

In Japanese Patent Application Laid-Open (KOKAI) No. 3-276423(1991), although there is described the method of producing a magnetic recording medium using ferromagnetic particles capable of being introduced into a kneader with a high flowability and an accurate quantity, the diameter of the granulated product is not specified at all. Therefore, this method also fails to sufficiently improve kneading property and dispersibility of ferromagnetic particles.

In Japanese Patent Publication (KOKOKU) No. 1-52442 (1989), there is described the method of producing magnetic metal particles by granulating and shaping iron oxide hydroxide or iron oxide into massive granulated product having a diameter of 0.5 to 30 mm, supplying the granulated product into a tubular reducing furnace, and heat-reducing the granulated product while passing a reducing gas therethrough in order to uniformly conduct the reduction reaction and simultaneously prevent the splash of particles. In this method, kneading property, dispersibility, flowability, storage efficiency and transport efficiency of the granulated product of magnetic metal particles are not specified at all.

In Japanese Patent Publication (KOKOKU) No. 4-70363 (1992), there is described the method of forming a fine oxide film and stabilizing magnetic properties thereof by shaping iron oxide hydroxide particles or iron oxide particles into pellets, heat-reducing the pellets to obtain pellets of metal particles, oxidizing the pellets to form an oxide film on the surface of each metal particle, and pulverizing the resultant pellets into particles having a size before the pelletization. In this method, in view of such a fact that the granulated product of magnetic metal particles is pulverized into the size before pelletization, the storage efficiency and transport efficiency of the granulated product are not considered at all. Therefore, this method also fails to provide the granulated product of magnetic metal particles having sufficient dispersibility and flowability.

In Japanese Patent Publication (KOKOKU) No. 7-62900 (1995), there is described the method of compacting fine ferromagnetic metal particles by sand mill, etc., in order to deaggregate an associated product of the fine ferromagnetic metal particles (including aggregates, agglomerates and softly associated product) and increase the content of primary particles in the fine ferromagnetic metal particles. In this method, although the associated product is strongly deaggregated into primary particles by applying a predetermined linear pressure thereto, the flowability thereof is not specified at all. As described in Comparative Example 3 hereinafter, such a method fails to provide a granulated product having a sufficient flowability. Also, in this method, the diameter of the granulated product of magnetic metal particles is not specified at all.

Further, in Japanese Patent Application Laid-Open (KOKAI) No. 8-172005(1996), although there are described metal iron particles for magnetic recording having a bulk density of 0.55 to 1.0 g/ml, the diameter of the granulated product optimum for kneading and the flowability thereof are not taught nor suggested.

As a result of the present inventors' earnest studies for solving the above problems, it has been found that by granulating and shaping a starting material such as goethite particles having an average major axial diameter of 0.05 to 0.40 µm as primary particles or hematite particles obtained by heat-dehydrating the goethite particles; heat-reducing the resultant granulated product to obtain a granulated product of magnetic metal particles; and pulverizing the obtained granulated product of magnetic metal particles using an apparatus having a crushing function for deaggregating the granulated product of magnetic metal particles by a rotor and a sizing function for forcibly passing the crushed product through a screen, the thus obtained secondary agglomerates of magnetic metal particles can exhibit not only a high storage efficiency, a high transport efficiency and an excellent handling property due to a good flowability thereof, but also excellent kneading property when kneaded with various binder resins and organic solvents in a kneader and excellent dilution-dispersibility when diluted with an additional amount of the organic solvent, upon the production of coating-type magnetic recording media, and as a result, the surface smoothness and squareness of a magnetic coating film obtained therefrom are further improved. The present invention has been attained on the basis of this finding.

SUMMARY OF THE INVENTION

An object of the present invention is to provide secondary agglomerates of magnetic metal particles which can exhibit not only a high storage efficiency, a high transport efficiency and a good flowability thereof, but also excellent kneading property when kneaded with various binder resins and organic solvents in a kneader and excellent dilution-dispersibility when diluted with an additional amount of the organic solvent, upon the production of coating-type magnetic recording media, and as result, the surface smoothness and squareness of a magnetic coating film obtained therefrom are further improved.

Another object of the present invention is to provide a process for producing the above secondary agglomerates of magnetic metal particles in an efficient and industrially advantageous manner.

To accomplish the aims, in a first aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°.

In a second aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm, a repose angle of 38 to 45°, an average particle diameter of not more than 53 μm in an amount of not more than 30% by weight, a bulk density of 0.35 to 0.65 g/ml, a tap density of 0.39 to 0.75 g/ml and a compaction percentage of 10 to 15%.

In a third aspect of the present invention, there is provided a process for producing the secondary agglomerates of magnetic metal particles as defined in the first aspect, which process comprises:

granulating and shaping goethite particles comprising primary particles having an average major axial diameter of 0.05 to 0.40 μm or hematite particles obtained by heat-dehydrating the goethite particles as a starting material;

heat-reducing the resultant granulated product of goethite or hematite particles to obtain a granulated product of magnetic metal particles; and deaggregating the obtained granulated product of magnetic metal particles using an apparatus having a crushing function for deaggregating the granulated product of magnetic metal particles by a rotor and a sizing function for forcibly passing the crushed particles through a screen.

In a fourth aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and said primary particles having an average major axial diameter of 0.05 to 0.25 μm, an aspect ratio of 4:1 to 13:1 and a BET specific surface area of 35 to 65 m²/g.

In a fifth aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and said primary particles having an average major axial diameter of 0.05 to 0.15 μm, an aspect ratio of 5:1 to 9:1, a size distribution (standard deviation/average major axial diameter) of not more than 0.30, a crystallite size $D_{110}$ of 130 to 160 Å, a Co content of from 0.5 to less than 6 atm % based on whole Fe, an Al content of from more than 10 to less than 20 atm % based on whole Fe, a rare earth content of 1.5 to 5 atm % based on whole Fe, an atomic ratio of Al to Co of from more than 2 to 4, a coercive force of 111.4 to 143.2 kA/m, an oxidation stability (Δσs) of saturation magnetization of not more than 10%, and an ignition temperature of not less than 130° C.

In a sixth aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and said primary particles having an average major axial diameter (L) of 0.05 to 0.15 μm; a coercive force of 111.4 to 143.2 kA/m; a Co content of from 0.5 to less than 5 atm % based on whole Fe; a crystallite size of from 150 to less than 170 Å; a specific surface area (S) represented by the formula:

$$S < -160 \times L + 65;$$

an oxidation stability (Δσs) of saturation magnetization of not more than 5%; and an ignition temperature of not less than 140° C.

In a seventh aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and said primary particles having a Co content of from 0.5 to less than 10 atm % based on whole Fe, an Al content of from 5 to 10 atm % based on whole Fe, a rare earth content of from 1 to 5 atm % based on whole Fe, an atomic ratio of Al to rare earth element of 1.5 to 5, calculated as atm % of the respective elements based on Fe, an average major axial length of 0.05 to 0.25 μm, a size distribution (standard deviation/major axial length) of not more than 0.26, an average minor axial length of 0.015 to 0.025 μm, an average aspect ratio of 5:1 to 9:1, a specific surface area of 30 to 60 m²/g, an ignition temperature of not less than 145° C., an oxidation stability (Δσs) of not more than 6%, and a coercive force of 103.5 to 143.2 kA/m.

In an eighth aspect of the present invention, there are provided secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and said primary particles having a Co content of from 0.5 to less than 10 atm % based on whole Fe, an Al content of 5 to 10 atm % based on whole Fe, a rare earth content of 1 to 5 atm % based on whole Fe, an atomic ratio of Al to rare earth element of 1.5 to 5, calculated as atm % of the respective elements based on Fe, an average major axial length of 0.15 to 0.25 µm, a size distribution (standard deviation/major axial length) of not more than 0.30, an average minor axial length of 0.015 to 0.025 µm, an average aspect ratio of 5:1 to 9:1, a specific surface area of 30 to 60 m$^2$/g, an ignition temperature of not less than 135° C., an oxidation stability (Δσs) of not more than 10%, and a coercive force of 103.5 to 143.2 kA/m.

In a ninth aspect of the present invention, there is provided a magnetic recording medium comprising a non-magnetic substrate and a magnetic recording layer formed on the non-magnetic substrate comprising a binder resin and magnetic metal particles containing iron as a main component which are derived from secondary agglomerates of magnetic metal particles containing primary particles having an average major axial diameter of 0.05 to 0.25 µm, said secondary agglomerates having an average particle diameter of 300 to 800 µm, an upper limit of particle diameter of 2,000 µm a repose angle of 38 to 45°.

In a tenth aspect of the present invention, there is provided a magnetic recording medium comprising a non-magnetic substrate and a magnetic recording layer formed on the non-magnetic substrate comprising a binder resin and magnetic metal particles containing iron as a main component which are derived from secondary agglomerates of magnetic metal particles containing primary particles having an average major axial diameter of 0.05 to 0.25 µm, said secondary agglomerates having an average particle diameter of 300 to 800 µm, an upper limit of particle diameter of 2,000 µm a repose angle of 38 to 45°, having a coercive force value of 111.4 to 143.2 kA/m, and when the magnetic coating film is oriented by applying a magnetic field of 397.9 kA/m thereto, a squareness (Br/Bm) of not less than 0.84, an orientation property (OR) of usually not less than 2.8, a coercive force distribution (Switching Field Distribution) of not more than 0.53 and an oxidation stability (ΔBm) of not more than 8.0%.

DETAILED DESCRIPTION OF THE INVENTION

Figure 1:
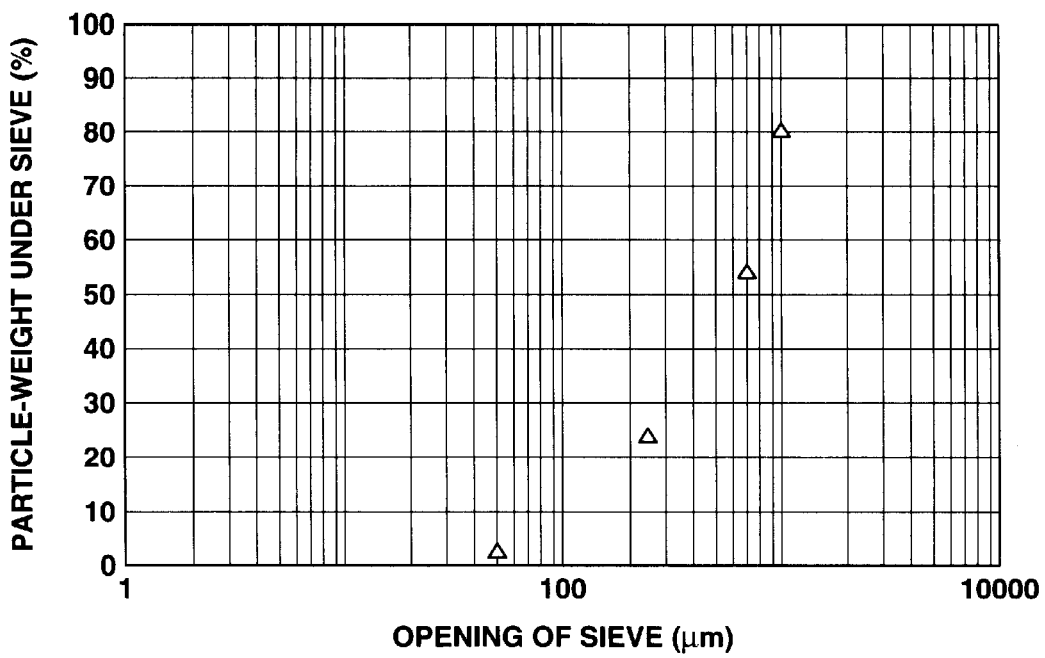
FIG. 1 is a view showing a weight-based integrated particle size distribution of secondary agglomerates of magnetic metal particles obtained in Example 1.

First, the secondary agglomerates of magnetic metal particles according to the present invention are described below.

The secondary agglomerates of magnetic metal particles according to the present invention have an average particle diameter of usually 300 to 800 µm, preferably 400 to 800 µm; an upper limit of granulated particle diameter of usually 2,000 µm; and an repose angle of usually 38 to 45°, preferably 39 to 44°.

When the average particle diameter is less than 300 µm, the repose angle of the secondary agglomerates tends to be increased, resulting in deteriorated flowability thereof. When the average particle diameter is more than 800 µm, it is difficult to obtain secondary agglomerates having good kneading property and dispersibility.

When the upper limit of granulated particle diameter of the secondary agglomerates is more than 2,000 µm, it is difficult to obtain secondary agglomerates having good kneading property and dispersibility.

The secondary agglomerates of the present invention contain those having a diameter of not more than 53 µm in an amount of usually not more than 30% by weight, preferably not more than 20% by weight. When the content of such agglomerates having a diameter of not more than 53 µm is more than 30% by weight, the obtained secondary agglomerates tend to show a large repose angle and deteriorated flowability, resulting in poor handling property thereof.

When the repose angle is more than 45°, the obtained secondary agglomerates also tend to be considerably deteriorated in flowability, resulting in poor handling property thereof.

The secondary agglomerates of magnetic metal particles according to the present invention are obtained by deaggregating a cylindrical granulated product of magnetic metal particles and, therefore, have an amorphous shape.

The secondary agglomerates of magnetic metal particles according to the present invention have a bulk density of preferably not less than 0.35 g/ml, more preferably not less than 0.50 g/ml. When the bulk density is less than 0.35 g/ml, the obtained secondary agglomerates tend to be considerably deteriorated in storage efficiency and transport efficiency. In particular, when the bulk density is not less than 0.50 g/ml, it is possible to further improve the storage efficiency and transport efficiency of the secondary agglomerates. The upper limit of the bulk density of the secondary agglomerates is usually 0.65 g/ml. When the bulk density is more than 0.65 g/ml, the distance between primary particles contained in the secondary agglomerates becomes too small, so that the dispersibility thereof in a magnetic coating composition tends to be deteriorated. The bulk density of the secondary agglomerates is in the range of more preferably 0.52 to 0.63 g/ml.

The secondary agglomerates of magnetic metal particles according to the present invention have a tap density of preferably 0.39 to 0.75 g/ml, more preferably 0.55 to 0.75 g/ml, still more preferably 0.57 to 0.73 g/ml.

The secondary agglomerates of magnetic metal particles according to the present invention have a compaction (or compression) percentage of preferably 10 to 15%. Secondary agglomerates having a compaction percentage of less than 10% tend to be difficult to produce. When the compaction percentage is more than 15%, the obtained secondary agglomerates tend to be extremely deteriorated in flowability.

As to magnetic properties of the secondary agglomerates of magnetic metal particles according to the present invention, the coercive force thereof is usually 103.5 to 206.9 kA/m (1,300 to 2,600 Oe); and the saturation magnetization thereof is usually 110 to 160 Am$^2$/kg (110 to 160 emu/g).

As primary particles of the magnetic metal particles constituting the secondary agglomerates of magnetic metal particles according to the present invention, there may be exemplified the following magnetic metal primary particles.

Magnetic Metal Primary Particles (A):

The magnetic metal primary particles (A) are magnetic metal particles containing iron as a main component, which have an average major axial diameter of usually 0.05 to 0.25 µm, preferably 0.05 to 0.20 µm. When the average major axial diameter is less than 0.05 µm, the magnetic metal particles containing iron as a main component have a too small particle size so as to be close to a particle size exhibiting superparamagnetism, resulting in deteriorated saturation magnetization and coercive force. Further, such too small magnetic metal particles containing iron as a main component show a poor dispersibility in coating composition, so that the oxidation stability thereof tends to be deteriorated. When the average major axial diameter is more than 0.25 µm, the magnetic metal particles containing iron as a main component have a too large particle size. As a result, a magnetic coating film produced using such large particles tends to be deteriorated in surface smoothness, so that it is difficult to improve output characteristics thereof.

The magnetic metal particles containing iron as a main component are preferably of an acicular shape, and have an aspect ratio of preferably 4:1 to 13:1. Here, the "acicular" particles include spindle-shaped particles and rice grain-shaped particles in addition to literally acicular particles. When the aspect ratio is less than 4:1, magnetic metal particles containing iron as a main component having the aimed coercive force tend to be obtained. When the aspect ratio is more than 13:1, the oxidation stability of the obtained magnetic metal primary particles tends to be deteriorated though it varies depending upon the major axial diameter thereof. In the case of the spindle-shaped particles, the aspect ratio thereof is more preferably 5:1 to 9:1.

The magnetic metal particles containing iron as a main component have a BET specific surface area of preferably 35 to 65 m$^2$/g, more preferably 40 to 60 m$^2$/g. When the BET specific surface area is less than 35 m$^2$/g, the particles are already sintered upon the previous heat-reduction step, so that it may be difficult to improve a squareness of a magnetic coating film produced using such particles. When the BET specific surface area is more than 65 m$^2$/g, the obtained magnetic metal primary particles tend to show a too high viscosity in the coating composition, resulting in poor dispersibility thereof.

Next, the magnetic metal particles containing iron as a main component are described below.

The magnetic metal particles containing iron as a main component is produced by heat-reducing a granulated product of the goethite or hematite particles at a temperature of usually 400 to 700° C. When the heat-reducing temperature is less than 400° C., the reduction reaction proceeds too slowly, resulting in prolonged reaction time. When the heat-reducing temperature is more than 700° C., the reduction reaction proceeds too rapidly, thereby causing deformation of the particles and sintering within or between the particles.

In the present invention, the obtained granulated product of magnetic metal particles containing iron as a main component may be taken out in air by known methods, for example, the method of immersing the granulated product in an organic solvent such as toluene; the method of replacing the atmosphere existing around the granulated product after heat-reduction, with an inert gas, and then gradually increasing the oxygen content of the inert gas until the inert gas is completely replaced with air; and the method of gradually oxidizing the granulated product using a mixed gas of oxygen and water vapor.

Magnetic Metal Primary Particles (B):

The magnetic metal primary particles (B) are spindle-shaped magnetic metal particles containing iron as a main component, having an average major axial diameter of usually 0.05 to 0.15 µm, an aspect ratio of usually from 5:1 to 9:1, a size distribution (standard deviation/average major axial diameter) of usually not more than 0.30, a crystallite size $D_{110}$ of usually 130 to 160 Å, a Co content of usually from 0.5 to less than 6 atm % based on whole Fe, an Al content of usually from more than 10 to less than 20 atm % based on whole Fe, a rare earth element content of usually from 1.5 to 5 atm % based on whole Fe, an atomic ratio of Al to Co of usually from more than 2 to 4, a coercive force of usually 111.4 to 143.2 kA/m (1,400 to 1,800 Oe), an oxidation stability of saturation magnetization ($\Delta\sigma s$) of usually not more than 10%, and an ignition temperature of usually not less than 130° C.

The spindle-shaped magnetic metal particles containing iron as a main component according to the present invention have a BET specific surface area of preferably 40 to 60 m$^2$/g, more preferably 45 to 60 m$^2$/g.

The spindle-shaped magnetic metal particles containing iron as a main component according to the present invention have a saturation magnetization σs of usually 110 to 160 Am$^2$/kg (110 to 160 emu/g).

The spindle-shaped magnetic metal particles containing iron as a main component according to the present invention have an oxidation stability of saturation magnetization ($\Delta\sigma s$) of preferably not more than 9% as an absolute value, and an ignition temperature of preferably not less than 135° C., after being subjected to an accelerated deterioration test at a temperature of 60° C. and a relative humidity of 90% for one week.

Next, the process for producing the spindle-shaped magnetic metal particles containing iron as a main component is described below.

In the present invention, the spindle-shaped magnetic metal particles containing iron as a main component are produced by heat-reducing the granulated product of spindle-shaped hematite particles. The heat-reducing temperature is preferably in the range of 400 to 700° C. When the heat-reducing temperature is less than 400° C., the reduction reaction proceeds too slowly, resulting in prolonged reaction time. When the heat-reducing temperature is more than 700° C., the reduction reaction proceeds too rapidly, thereby causing deformation of the particles and sintering within or between the particles.

The granulated product of spindle-shaped magnetic metal particles containing iron as a main component, which are obtained after the heat-reduction step, may be taken out in air by known methods, for example, the method of immersing the granulated product in an organic solvent such as toluene; the method of replacing the atmosphere existing around the granulated product after heat-reduction, with an inert gas, and then gradually increasing the oxygen content of the inert gas until the inert gas is finally replaced with air; and the method of gradually oxidizing the granulated product using a mixed gas of oxygen and water vapor.

Magnetic Metal Primary Particles (C):

The magnetic metal primary particles (C) are spindle-shaped magnetic metal particles containing iron as a main component which have an average major axial diameter (L) of usually 0.05 to 0.15 µm; a coercive force of usually 111.4 to 143.2 kA/m (1,400 to 1,800 Oe); a Co content of usually from 0.5 to less than 5 atm % based on whole Fe; a crystallite size of usually from 150 to less than 170 Å; a specific surface area (S) represented by the formula:

$$S < -160 \times L + 65;$$

an oxidation stability (Δσs) of saturation magnetization of usually not more than 5%; and an ignition temperature of usually not less than 140° C.

In addition, the spindle-shaped magnetic metal particles containing iron as a main component have an Al content of preferably 5 to 10 atm % based on whole Fe, and a rare earth content of preferably 1.5 to 5 atm % based on whole Fe.

The lower limit of the BET specific surface area is preferably 30 m²/g.

The spindle-shaped magnetic metal particles containing iron as a main component have a size distribution (standard deviation/average major axial diameter) of preferably not more than 0.30. The size distribution of the spindle-shaped magnetic metal particles containing iron as a main component is preferably as low as possible. Therefore, although the lower limit of the size distribution is not particularly restricted, the size distribution of the spindle-shaped magnetic metal particles containing iron as a main component is suitably not less than about 0.10 from the standpoint of industrial production thereof. The aspect ratio of the spindle-shaped magnetic metal particles containing iron as a main component is preferably 4:1 to 8:1.

The spindle-shaped magnetic metal particles containing iron as a main component have a saturation magnetization σs of preferably 120 to 140 Am²/kg (120 to 140 emu/g).

The spindle-shaped magnetic metal particles containing iron as a main component have an oxidation stability (Δσs) of saturation magnetization (σs) of preferably not more than 5.0% as an absolute value when subjected to an acceleration deterioration test at a temperature of 60 and a relative humidity of 90% for one week.

Next, the process for producing the spindle-shaped magnetic metal particles containing iron as a main component is described below.

The granulated product of the spindle-shaped magnetic metal particles containing iron as a main component are produced by introducing the granulated product of the spindle-shaped hematite particles into a reducing apparatus to form a fixed bed of the granulated product of the hematite particles therein, and then heat-reducing the granulated product.

As the reducing apparatus in which the fixed bed of the granulated product of the spindle-shaped hematite particles is formed, there may be preferably used a moving-type (continuous-type) reducing apparatus having a movable belt or tray supporting the fixed bed thereon, and reducing the fixed bed while moving the belt or tray.

The height of the fixed bed composed of the granulated product of the spindle-shaped hematite particles is preferably 3 to 15 cm, more preferably 4 to 14 cm. When the fixed bed height is more than 15 cm, the lower portion of the fixed bed is rapidly reduced, so that the water vapor partial pressure in the system is considerably increased, thereby causing problems such as deterioration in coercive force of the fixed bed upper portion. As a result, the properties of the obtained granulated product are deteriorated as a whole. When the fixed bed height is less than 3 cm, the granulated product of the spindle-shaped hematite particles tends to be scattered around, though the degree of scattering varies depending upon the superficial velocity of gas introduced.

During the period of heating to the reducing temperature of 400 to 700° C., the system is maintained in a reducing gas atmosphere. As the suitable reducing gas, there may be used hydrogen. If an atmosphere other than the reducing gas, especially an inert gas atmosphere such as nitrogen is used during the heating period, the reduction reaction proceeds too rapidly when the atmosphere is switched to the reducing gas at the reduction step after the heating, thereby failing to achieve uniform growth of particles and, therefore, to obtain a high coercive force.

The superficial velocity of the reducing gas used in the heating step of the present invention is usually 40 to 150 cm/s, preferably 40 to 140 cm/s. When the superficial velocity of the reducing gas is less than 40 cm/s, the water vapor generated upon the heat-reduction of the hematite particles may be discharged out of the reaction system only at a too low velocity. As a result, the particles obtained from the upper portion of the fixed bed composed of the hematite particles may be deteriorated in coercive force, and the coating film produced using such particles may have a poor SFD. Thus, the resultant magnetic metal particles may be deteriorated in coercive force as a whole. When the superficial velocity of the reducing gas is more than 150 cm/s, although the aimed spindle-shaped magnetic metal particles can be obtained, there may arise problems such as necessity of high reducing temperature, breakage of granulated product due to scattering thereof or the like.

The temperature rising rate used in the heating step is usually 10 to 80° C./minute, preferably 20 to 70° C./minute. When the temperature rising rate is less than 10° C./minute, the reduction reaction of the hematite particles may proceed too slowly from the lower layer of the fixed bed thereof in the low temperature range, so that the crystallite size of the obtained magnetic metal particles may tend to become too small, and the water vapor generated upon the heat-reduction may be discharged out of the reaction system at a too low velocity. As a result, the particles obtained from the upper portion of the fixed bed may be deteriorated in coercive force, and the coating film produced using such particles may have a poor SFD. Further, the crystallinity of the particles obtained from the lower layer of the fixed bed may become deteriorated. Thus, the resultant magnetic metal particles may be deteriorated in coercive force as a whole. When the temperature rise rate is more than 80° C./minute, the conditions are similar to the case where the temperature is increased in a nitrogen atmosphere. Therefore, the reduction reaction of the hematite particles may proceed too rapidly, resulting in relatively high partial pressure of water vapor generated. The high partial pressure of the water vapor causes the conversion of the particles to α-Fe. For this =reason, the resultant magnetic metal particles may have a large crystallite size and may be deteriorated in coercive force, so that the coating film produced using such particles may be deteriorated in SFD.

The atmosphere used in the heat-reduction step of the present invention is constituted from the reducing gas. The reducing gas is preferably hydrogen.

The heat-reducing temperature is preferably 400 to 700° C. When the heat-reducing temperature is less than 400° C., the reduction reaction may proceed too slowly, resulting in prolonged reaction time. When the heat-reducing temperature is more than 700° C., the reduction reaction may proceed too rapidly, so that there tend to arise problems such as deformation of particles and sintering within or between particles.

After the heat-reduction, the obtained magnetic metal particles containing iron as a main component may be taken out in air by known methods, for example, the method of immersing the obtained spindle-shaped magnetic metal particles in an organic solvent such as toluene; the method of replacing the atmosphere surrounding the spindle-shaped magnetic metal particles containing iron as a main component which are obtained after heat-reduction, with an inert gas, and then gradually increasing the oxygen content of the inert gas until the inert gas is finally replaced with air; and the method of gradually oxidizing the spindle-shaped magnetic metal particles using a mixed gas of oxygen and water vapor.

Magnetic Metal Primary Particles (D):

The magnetic metal primary particles (D) are spindle-shaped magnetic metal particles containing iron as a main component, which have a Co content of usually from 0.5 to less than 10 atm % based on whole Fe; an Al content of usually 5 to 10 atm % based on whole Fe; a rare earth content of usually 1 to 5 atm % based on whole Fe; a ratio of Al to rare earth element of usually 1.5 to 5 (calculated as atm % of the respective elements based on Fe); an average major axial length of usually 0. 15 to 0.25 $\mu$m; a size distribution (standard deviation/major axial length) of usually not more than 0.26; an average minor axial length of usually 0.015 to 0.025 $\mu$m; an average aspect ratio of usually 5:1 to 9:1; an ignition temperature of usually not less than 145° C.; an oxidation stability ($\Delta\sigma s$) of usually not more than 6%; and a coercive force of usually 103.5 to 143.2 kA/m (1,300 to 1,800 Oe).

In addition, the spindle-shaped magnetic metal particles containing iron as a main component have a specific surface area of preferably 30 to 60 $m^2/g$, more preferably 35 to 55 $m^2/g$.

The magnetic metal primary particles (D) have a saturation magnetization $\sigma s$ of 110 to 160 $Am^2/kg$ (110 to 160 emu/g); a squareness ($\sigma r/\sigma s$) of not less than 0.50; and a crystallite size $D_{110}$ of 130 to 180 Å, preferably 140 to 170 Å.

Next, the process for producing the spindle-shaped magnetic metal particles containing iron as a main component is described below.

The granulated product of the spindle-shaped hematite particles as a starting material are introduced into a reducing apparatus to form a fixed bed of the hematite particles therein, and then heat-reduced, thereby obtaining a granulated product of the spindle-shaped magnetic metal particles containing iron as a main component.

As the reducing apparatus in which the fixed bed of the granulated product of the spindle-shaped hematite particles is formed, there may be preferably used a moving-type (continuous-type) reducing apparatus having a movable belt or tray supporting the fixed bed thereon, and reducing the fixed bed while moving the belt or tray.

The height of the fixed bed composed of the starting material is 3 to 15 cm, preferably 4 to 14 cm. When the fixed bed height is more than 15 cm, the fixed bed lower portion is rapidly reduced, so that the water vapor partial pressure in the system is considerably increased, thereby causing problems such as deteriorated coercive force of the fixed bed upper portion. As a result, properties of the obtained granulated product are deteriorated as a whole. When the fixed bed height is less than 3 cm, the granulated product tends to be scattered around, though the degree of scattering varies depending upon the superficial velocity of gas introduced. In the consideration of industrial productivity, the fixed bed height is preferably 3 to 14 cm.

During the period of heating to the reducing temperature of 400 to 700° C., the system is maintained in a reducing gas atmosphere. As the reducing gas, there may be suitably used hydrogen. If an atmosphere other than the reducing gas, especially an inert gas atmosphere such as nitrogen is used during the heating period, the reduction reaction proceeds too rapidly when the atmosphere is switched to the reducing gas at the reduction step after the heating, thereby failing to achieve uniform growth of particles and, therefore, to obtain a high coercive force.

The superficial velocity of the reducing gas used in the heating step of the present invention, is usually 40 to 150 cm/s, preferably 40 to 140 cm/s. When the superficial velocity of the reducing gas is less than 40 cm/s, water vapor generated upon reducing the hematite particles is discharged out of the system at a too low velocity, thereby causing deterioration in coercive force of the fixed bed upper portion as well as deterioration in SFD of coating film produced therefrom. As a result, the obtained granulated product fails to show a high coercive force as a whole. When the superficial velocity of the reducing gas is more than 150 cm/s, although the aimed granulated product of the spindle-shaped magnetic alloy particles are obtained, there arise problems such as need of too high reducing temperature, shape breakage due to scattered granulated product, etc.

The temperature rise rate used in the heating step of the present invention is usually 10 to 80° C./minute, preferably 20 to 70° C./minute. When the temperature rise rate is less than 10° C./minute, since the reduction reaction proceeds too slowly from the fixed bed lower portion in a low temperature range, the obtained granulated product of the magnetic metal particles tend to exhibit a very small crystallite size, and water vapor generated upon the reduction reaction tends to be discharged out of the system at a too low velocity, thereby causing problems such as deterioration in coercive force of the fixed bed upper portion as well as deterioration in SFD of coating film produced therefrom, in addition to deterioration in crystallizability of the fixed bed lower portion. As a result, the obtained product fails to exhibit a high coercive force as a whole. When the temperature rise rate is more than 80° C./minute, since the reduction reaction proceeds too rapidly similarly to when heated in a nitrogen atmosphere, the transfer to α-Fe is conducted under a relatively high water vapor partial pressure. As a result, the obtained granulated product of the magnetic metal particles have a large crystallite size, resulting in deterioration in coercive force thereof as well as deterioration in SFD of coating film produced therefrom.

The atmosphere used in the heat-reduction step is a reducing gas atmosphere. As the reducing gas, there may be suitably used hydrogen.

The heat-reducing temperature used in the heat-reduction step, is usually 400 to 700° C., preferably 400 to 650° C., more preferably 400 to 600° C. The heat-reducing temperature may be appropriately selected from the above-specified range according to kind and amount of compounds used for coating the starting material. When the heat-reducing temperature is less than 400° C., the reduction reaction proceeds too slowly, resulting in industrially disadvantageous process. As a result, the obtained granulated product of the spindle-shaped magnetic alloy particles are deteriorated in saturation magnetization. When the heat-reducing temperature is more than 700° C., the reduction reaction proceeds too rapidly, thereby causing shape breakage of particles and sintering within or between the particles. As a result, the obtained particles are deteriorated in coercive force.

The granulated product of the spindle-shaped magnetic metal particles containing iron as a main component which are obtained after the heat-reduction step, may be taken out in air by known methods, for example, the method of immersing the granulated product in an organic solvent such as toluene; the method of replacing the atmosphere existing around the granulated product of the spindle-shaped magnetic metal particles containing iron as a main component after heat-reduction, with an inert gas, and then gradually increasing the oxygen content of the inert gas until the inert gas is finally replaced with air; and the method of gradually oxidizing the granulated product using a mixed gas of oxygen and water vapor.

Magnetic Metal Primary Particles (E):

The magnetic metal primary particles (E) are spindle-shaped magnetic metal particles containing iron as a main component which have a Co content of usually from 0.5 to less than 10 atm % based on whole Fe; an Al content of usually 5 to 10 atm % based on whole Fe; a rare earth content of usually 1 to 5 atm % based on whole Fe; a ratio of Al to rare earth element of usually 1.5 to 5 (calculated as atm % of the respective elements based on Fe); an average major axial length of usually 0.15 to 0.25 μm; a size distribution (standard deviation/major axial length) of usually not more than 0.30; an average minor axial length of usually 0.015 to 0.025 μm; an average aspect ratio of usually 5:1 to 9:1; an ignition temperature of usually not less than 135° C.; an oxidation stability ($\Delta\sigma s$) of usually not more than 10%; and a coercive force of usually 1,300 to 1,800 Oe.

In addition, the spindle-shaped magnetic metal particles containing iron as a main component have a specific surface area of preferably 30 to 60 $m^2/g$, more preferably 35 to 55 $m^2/g$.

The spindle-shaped magnetic metal particles containing iron as a main component have an oxidation stability ($\Delta\sigma s$) of saturation magnetization ($\sigma s$) of preferably not more than 8% as an absolute value when subjected to an acceleration deterioration test at a temperature of 60° C. and a relative humidity of 90% for one week; and an ignition temperature of preferably not less than 140° C.

The spindle-shaped magnetic metal particles containing iron as a main component have a saturation magnetization $\sigma s$ of preferably 110 to 160 emu/g.

The spindle-shaped magnetic metal particles containing iron as a main component have a crystallite size $D_{110}$ of preferably 130 to 180 Å, more preferably 140 to 170 Å.

Next, the process for producing the spindle-shaped magnetic metal particles containing iron as a main component is described below.

The granulated product of the spindle-shaped magnetic metal particles containing iron as a main component are produced by heat-reducing the granulated product of the spindle-shaped hematite particles.

The heat-reducing temperature is preferably in the range of 400 to 700° C. When the heat-reducing temperature is less than 400° C., the reduction reaction proceeds too slowly, resulting in prolonged reaction time. When the heat-reducing temperature is more than 700° C., the reduction reaction proceeds too rapidly, thereby causing deformation of the particles and sintering within or between the particles.

The granulated product of the spindle-shaped magnetic metal particles containing iron as a main component which are obtained after the heat-reduction step, may be taken out in air by known methods, for example, the method of immersing the granulated product of the magnetic metal particles in an organic solvent such as toluene; the method of replacing the atmosphere existing around the granulated product of the spindle-shaped magnetic metal particles containing iron as a main component after heat-reduction, with an inert gas, and then gradually increasing the oxygen content of the inert gas until the inert gas is finally replaced with air; and the method of gradually oxidizing the granulated product of the magnetic metal particles using a mixed gas of oxygen and water vapor.

Next, the process for producing the secondary agglomerates of magnetic metal particles according to the present invention is described below.

The secondary agglomerates of magnetic metal particles according to the present invention are produced by granulating goethite particles or hematite particles obtained by heat-treating the goethite particles, into desired size; reducing the obtained granulated product of goethite or hematite particles to form a granulated product of magnetic metal particles; and deaggregating the granulated product.

The granulated product of goethite or hematite particles is produced by various granulating methods such as rolling granulation, compression granulation, deaggregating granulation, extrusion granulation or the like. Among these methods, it is industrially preferred that the granulated product of goethite or hematite particles is produced by compression-dehydrating a suspension containing goethite or hematite particles coated with an anti-sintering agent using a filter press, and then extrusion-granulating the obtained filter cake.

The granulated product of goethite or hematite particles used as a starting material is of a cylindrical shape having an average granulated particle size (average length) of usually 1 to 10 mm and an average diameter of usually 2 to 4 mm, and have a bulk density of usually not less than 0.25 g/ml, preferably not less than 0.3 g/ml, more preferably not less than 0.4 g/ml.

When the average granulated particle size of the granulated product of the starting material is less than 1 mm, the granulated product is considerably fluidized by a reducing gas flow introduced. As a result, the particles suffer from impingement or collision and frictional contact therebetween, resulting in sintering between the particles and shape breakage of primary particles thereof. Further, the particles tend to be scattered out of the system because of fineness thereof, thereby causing problems such as formation of dusts, clogging of exhaust gas filter or the like. When the average granulated particle size of the granulated product is more than 5 mm, it takes a long time until the reducing gas reaches the inside of each granulated particle, and further the diffusion of water vapor into each granulated product which determines the reduction reaction velocity, becomes too slow, resulting in prolonged reducing time and deteriorated productivity and magnetic properties.

When the bulk density of the granulated product is less than 0.25 g/ml, the granulated product tends to have a too low strength, resulting in formation of fine dusts. Further, when the amount of the reducing gas introduced is increased for enhancing the reducing efficiency, the granulated product tends to be fluidized because of lightweight of individual granulated particles. As a result, the granulated product suffers from impingement or collision and frictional contact therebetween, resulting in sintering between the particles and shape breakage of primary particles thereof.

Then, in the present invention, the granulated product of goethite or hematite particles is heat-reduced at a temperature, thereby obtaining a granulated product of magnetic metal particles.

In the present invention, the granulated product of magnetic metal particles may be taken out in air by known methods.

The granulated product of magnetic metal particles is of a cylindrical shape having an average granulated particle size (average length) of usually 1 to 5 mm and an average diameter of usually 2 to 3 mm, and has a repose angle of usually 36 to 43°; a bulk density of usually 0.35 to 0.65 g/ml, preferably 0.50 to 0.65 g/ml; a tap density of usually 0.39 to 0.75 g/ml, preferably 0.55 to 0.75 g/ml; and a compaction percentage of usually 8 to 13%.

In the present invention, after the heat-reduction, the obtained granulated product of magnetic metal particles is subjected to deaggregating treatment.

Here, the "deaggregating treatment" used in the present invention means such a treatment of deaggregating the granulated product of magnetic metal particles using an apparatus having a crushing function for deaggregating the granulated product by a rotor and a sizing function for forcibly passing the crushed particles through a screen. More specifically, the granulated product of magnetic metal particles is crushed by a rotor having twin screws rotated in opposite directions, and then sized or grated by forcibly passing the crushed particles through a screen having a mesh size of usually 1.0 to 2.0 mm. As the apparatus for the deaggregating treatment, there may be used RUNDEL MILL RMI Model manufactured by Tokuju Kosakusho Co., Ltd., a combined granulator manufactured by Turbo Kogyo Co., Ltd., or the like. The apparatus is preferably operated at a rotor-rotating speed of usually 100 to 400 rpm while charging thereinto the material to be treated at a velocity of usually 1 to 10 kg/minute.

Meanwhile, as the screen of the apparatus, there may be used either a punching-type screen obtained by punching a metal plate, or a mesh-type screen obtained by weaving wires.

Examples of the goethite particles as a starting material are as follows.

(1) Goethite Particles (A):

The goethite particles (A) used in the present invention are those showing an acicular shape, and having an average major axial diameter of usually 0.05 to 0.40 $\mu$m, preferably 0.05 to 0.30 $\mu$m; an aspect ratio of usually 5:1 to 15:1, preferably 5:1 to 10:1; and a BET specific surface area of usually 70 to 250 m$^2$/g, preferably 100 to 250 m$^2$/g.

The goethite particles preferably contain Co and Al in amounts of preferably 0.5 to 45 atm % and preferably 5 to 20 atm %, respectively.

The goethite particles as starting materials may be produced by ordinary methods.

Goethite Particles (B):

The goethite particles (B) used in the present invention are spindle-shaped goethite particles having a cobalt content of usually from 0.5 to less than 6 atm %, preferably from 0.5 to less than 5 atm % based on whole Fe, an aluminum content of usually from more than 10 to less than 20 atm %, preferably from 10.5 to 18 atm % based on whole Fe, and an atomic ratio of Al to Co of usually from more than 2:1 to 4:1, preferably from 2.10:1 to 3.90:1.

The spindle-shaped goethite particles are have an average major axial diameter of usually 0.05 to 0.18 $\mu$m; a size distribution (standard deviation/average major axial diameter) of usually not more than 0.20; and an aspect ratio of usually from more than 6:1 to less than 10:1.

It is preferred that the size distribution of the spindle-shaped goethite particles of the present invention is as small as possible. Although the lower limit of the size distribution of the spindle-shaped goethite particles is not particularly restricted, in the consideration of industrial productivity, the size distribution is more preferably about 0.08 to about 0.12.

In addition, the spindle-shaped goethite particles of the present invention have a BET specific surface area of usually 100 to 200 m$^2$/g, preferably 130 to 200 m$^2$/g, more preferably 150 to 200 m$^2$/g.

The spindle-shaped goethite particles have a crystallite size $D_{020}$ of preferably 150 to 250 Å; a crystallite size $D_{110}$ of preferably 80 to 120 Å; and a crystallite size ratio of $D_{020}/D_{110}$ of preferably 1.8 to 2.4.

The spindle-shaped goethite particles of the present invention are each constituted by a seed crystal portion and a surface layer portion. Cobalt is present in both the seed crystal and surface layer portions, while aluminum is present only in the surface layer portion. Here, the "seed crystal portion" means a goethite seed crystal particle produced by oxidizing the ferrous salt prior to the addition of the Al compound. More specifically, the seed crystal portion is a portion having a specific weight percentage of Fe determined by the oxidation percentage of Fe$^{2+}$, preferably a portion extending outwardly from the center of each goethite particle, which portion corresponds to an amount of usually 40 to 50% by weight based on whole Fe contained in the goethite particle.

The ratio of the crystallite size $D_{020}$ of the spindle-shaped goethite particle to the crystallite size $D_{020}$ of the seed crystal particle thereof [$D_{020}$(spindle-shaped goethite particle)/$D_{020}$(seed crystal particle)] is preferably 1.05 to 1.20; and the ratio of the crystallite size $D_{110}$ of the spindle-shaped goethite particle to the crystallite size $D_{110}$ of the seed crystal particle thereof [$D_{110}$(spindle-shaped goethite particle)/$D_{110}$(seed crystal particle)] is preferably 1.02 to 1.10.

The existence amount of Co (Co concentration) contained in the seed crystal portion is preferably 75 to 95, more preferably 80 to 90 based on the total amount of Co (Co concentration), assuming that the total amount of Co (Co concentration) is 100. The existence amount of Co (Co concentration) contained in the surface layer portion is preferably 103 to 125, more preferably 106 to 120 based on the total amount of Co (Co concentration) contained in whole spindle-shaped goethite particle.

More specifically, the surface layer portion is a portion extending inwardly from the outermost surface of each goethite particle, which portion corresponds to an amount of usually 50 to 60% by weight based on whole Fe contained in the goethite particle. Aluminum is present only in the surface layer portion.

Next, the process for producing the spindle-shaped goethite particles is described below.

The spindle-shaped goethite particles are produced by first forming spindle-shaped goethite seed crystal particles and then growing a goethite layer on the surface of respective goethite seed crystal particles.

The spindle-shaped goethite seed crystal particles are obtained as follows. That is, in the production of the spindle-shaped goethite seed crystal particles comprising reacting an aqueous ferrous salt solution with a mixed aqueous alkali solution of an aqueous alkali carbonate solution and an aqueous alkali hydroxide solution; aging the resultant water suspension containing a ferrous-containing precipitate in a non-reducing atmosphere; and then passing an oxygen-containing gas through the water suspension to conduct an oxidation reaction thereof, a Co compound is added in an amount of usually from 0.5 to less than 6 atm %, preferably from 0.5 to less than 5 atm % (calculated as Co) based on whole Fe, to the water suspension containing the ferrous-containing precipitate during aging of the water suspension but prior to the elapse of half a period of the whole aging time before initiation of the oxidation reaction, and then the oxidation reaction for producing the spindle-shaped goethite seed crystal particles is conducted such that usually 40 to 50% of whole Fe$^{2+}$ is oxidized.

The aging of the water suspension is conducted at a temperature of preferably 40 to 80° C. in a non-oxidative atmosphere. The aging time is usually 30 to 300 minutes. In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing percentage of these aqueous solutions (% calculated as normality) is adjusted such that the concentration of the aqueous alkali hydroxide solution is preferably 10 to 40%, more preferably 15 to 35% (calculated as normality).

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5 when expressed by the equivalent ratio of alkali contained therein to whole Fe contained in the aqueous ferrous salt solution.

The ferrous ion concentration of the solution obtained by mixing the aqueous ferrous salt solution with the mixed aqueous alkali solution is preferably 0.1 to 1.0 mol/liter, more preferably 0.2 to 0.8 mol/liter.

The pH value of the solution used in the production reaction of the spindle-shaped goethite seed crystal particles is preferably 8.0 to 11.5, more preferably 8.5 to 11.0.

The production of the spindle-shaped goethite seed crystal particles is conducted by the oxidation reaction, i.e., by passing an oxygen-containing gas such as air through the solution. The superficial velocity of the oxygen-containing gas is preferably 0.5 to 3.5 cm/s, more preferably 1.0 to 3.0 cm/s. Here, the "superficial velocity" means an amount of the oxygen-containing gas passed per unit sectional area (bottom sectional area of a cylindrical reactor where the pore diameter and pore number of a perforated plate are ignored; unit: cm/sec).

The production reaction of the spindle-shaped goethite seed crystal particles may be sufficiently conducted at a temperature of not more than 80° C.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging thereof before initiation of the oxidation reaction.

The amount of the Co compound added is usually from 0.5 to less than 6 atm %, preferably from 0.5 to less than 5 atm % based on whole Fe contained in the spindle-shaped goethite particles.

The pH value of the water suspension used in the growth reaction of the goethite layer is usually 8.0 to 11.5, preferably 8.5 to 11.0.

The growth of the goethite layer is conducted by the oxidation reaction, i.e., by passing an oxygen-containing gas such as air though the water suspension. The superficial velocity of the oxygen-containing gas used in the growth reaction of the goethite layer is preferably larger than that used in the production reaction of the seed crystal particles.

The growth reaction of the goethite layer may be sufficiently conducted at a temperature of usually not more than 80° C. at which goethite particles can be produced. The growth reaction temperature is preferably 45 to 55° C.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the Al compound may be added simultaneously with the oxidation reaction in which the oxygen-containing gas is passed through the water suspension at such a superficial velocity preferably larger than that used in the production reaction of the seed crystal particles. When the addition of the Al compound requires a long period of time, the oxygen-containing gas may be replaced with a nitrogen-containing gas so as not to accelerate the oxidation reaction.

The amount of the Al compound added is usually from more than 10 to less than 20 atm % based on whole Fe contained in the spindle-shaped goethite particles.

Goethite Particles (C):

The spindle-shaped goethite particles (C) are those containing Co in an amount of usually from 0.5 to less than 5 atm % based on whole Fe, and Al in an amount of usually 5 to 10 atm % based on whole Fe.

The spindle-shaped goethite particles have an average major axial diameter of usually 0.05 to 0.18 μm; a size distribution (standard deviation/average major axial diameter) of usually not more than 0.20; and an aspect ratio of (average major axial diameter/average minor axial diameter) of usually 4:1 to 8:1.

The size distribution of the spindle-shaped goethite particles is preferably as low as possible. Therefore, although the lower limit of the size distribution is not particularly restricted, the size distribution of the spindle-shaped goethite particles is preferably not less than about 0.10 from industrial viewpoint.

The spindle-shaped goethite particles have a BET specific surface area of preferably 100 to 160 m$^2$/g.

The spindle-shaped goethite particles have a crystallite size $D_{020}$ of preferably 100 to 200 Å, a crystallite size $D_{110}$ of preferably 90 to 130 Å, and a crystallite size ratio $D_{020}/D_{110}$ of preferably less than 1.8.

The spindle-shaped goethite particles are each constituted by a seed crystal portion and a surface layer portion. Cobalt is present in both the seed crystal and surface layer portions, while aluminum is present only in the surface layer portion. Here, the "seed crystal portion" means a goethite seed crystal particle produced by oxidizing a part of the ferrous salt added, prior to the addition of the Al compound. More specifically, the seed crystal portion is a portion having a specific weight percentage of Fe determined by the oxidation percentage of $Fe^{2+}$, preferably a portion extending outwardly from the center of each goethite particle and corresponding to usually 30 to 50% by weight of the goethite particle.

Next, the process for producing the spindle-shaped goethite particles is described below.

The spindle-shaped goethite particles are produced by first forming spindle-shaped goethite seed crystal particles and then growing a goethite layer on the surface of respective goethite seed crystal particles.

The production conditions of spindle-shaped goethite seed crystal particles are as follows. That is, upon the production of the spindle-shaped goethite seed crystal particles by reacting an aqueous ferrous salt solution with a mixed aqueous alkali solution of an aqueous alkali carbonate solution and an aqueous alkali hydroxide solution to form a water suspension containing a ferrous-containing precipitate; aging the resultant water suspension in a non-oxidative atmosphere; and then passing an oxygen-containing gas through the water suspension to conduct an oxidation reaction thereof, a Co compound is added in an amount of usually from 0.5 to less than 5 atm % (calculated as Co) based on whole Fe, to the water suspension containing the ferrous-containing precipitate during aging of the water suspension but prior to the elapse of 20% of the whole aging time before initiation of the oxidation reaction, and then the oxidation reaction is conducted such that usually 30 to 50% of whole $Fe^{2+}$ contained in spindle-shaped goethite particles is oxidized.

The aging of the water suspension in a non-oxidative atmosphere may be suitably conducted at a temperature of 40 to 80° C. The aging time is usually 30 to 300 minutes. In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing ratio between these aqueous solutions (% calculated as normality) is adjusted such that the concentration of the aqueous alkali hydroxide solution is preferably 10 to 40%, more preferably 15 to 35% (calculated as normality).

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5, calculated as the equivalent ratio of alkali contained therein to whole Fe contained in the aqueous ferrous salt solution.

The ferrous iron concentration of the solution obtained by mixing the aqueous ferrous salt solution with the mixed aqueous alkali solution is preferably 0.1 to 1.0 mol/liter, more preferably 0.2 to 0.8 mol/liter.

The pH value of the water suspension used in the production reaction of the spindle-shaped goethite seed crystal particles is preferably 8.0 to 11.5, more preferably 8.5 to 11.0.

The production reaction of the spindle-shaped goethite seed crystal particles is conducted by the oxidation reaction, i.e., by passing an oxygen-containing gas such as air through the solution.

The superficial velocity of the oxygen-containing gas is preferably 2.3 to 3.5 cm/s. Here, the "superficial velocity" means an amount of the oxygen-containing gas passed per unit sectional area (bottom sectional area of a cylindrical reactor where the pore diameter and pore number of a perforated plate are ignored; unit: cm/sec).

The production reaction of the spindle-shaped goethite seed crystal particles may be sufficiently conducted at a temperature of not more than 80° C. When the reaction temperature is more than 80° C., magnetite particles tend to be produced and mixed in the aimed spindle-shaped goethite particles. The reaction temperature is preferably 45 to 55° C.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging before initiation of the oxidation reaction.

The amount of the Co compound added is in the range of from 0.5 to less than 5 atm % based on whole Fe contained in the spindle-shaped goethite particles as a final product.

The pH value of the water suspension used in the growth reaction of the goethite layer is usually 8.0 to 11.5, preferably 8.5 to 11.0.

The growth of the goethite layer is conducted by the oxidation reaction, i.e., by passing an oxygen-containing gas such as air though the water suspension. The superficial velocity of the oxygen-containing gas used in the growth reaction of the goethite layer is preferably larger than that used in the production reaction of the seed crystal particles.

The growth reaction of the goethite layer may be sufficiently conducted at a temperature of usually not more than 80° C. at which goethite particles can be produced. The growth reaction temperature is preferably 45 to 55° C.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the Al compound may be added simultaneously with passing the oxygen-containing gas through the water suspension preferably at a higher superficial velocity than that used in the production reaction of the seed crystal particles.

The amount of the Al compound added is usually from 5 to 10 atm % based on whole Fe contained in the spindle-shaped goethite particles.

Goethite Particles (D):

The goethite particles (D) are spindle-shape goethite particles containing Co in an amount of from usually 0.5 to less than 8 atm % based on whole Fe, and Al in an amount of usually 5 to 10 atm % based on whole Fe, and having an average major axial length of usually 0.18 to 0.30 μm; a size distribution (standard deviation/major axial length) of usually not more than 0.22; an average minor axial length of usually 0.025 to 0.045 μm; and an average aspect ratio of usually 5:1 to 10:1.

The spindle-shaped goethite particles have a BET specific surface area of preferably 100 to 150 m$^2$/g.

The spindle-shaped goethite particles have a crystallite size ratio $D_{020}/D_{110}$ of preferably 1.8 to 2.4; a crystallite size $D_{020}$ of preferably 200 to 280 Å: and a crystallite size $D_{110}$ of preferably 100 to 140 Å.

The spindle-shaped goethite particles are each constituted by a seed crystal portion and a surface layer portion. Cobalt is contained in both the seed crystal and surface layer portions, while aluminum is contained only in the surface layer portion. Here, the "seed crystal portion" means a goethite seed crystal particle produced by oxidizing a part of the ferrous salt added, prior to the addition of the Al compound. More specifically, the seed crystal portion is a portion having a specific weight percentage of Fe determined by the oxidation percentage of $Fe^{2+}$, preferably a portion extending outwardly from the center of each goethite particle and corresponding to usually 40 to 50% by weight of the goethite particle.

The spindle-shaped goethite particles have a crystallite size ratio $D_{020}$(whole goethite particle)/$D_{020}$(goethite seed crystal particle) of preferably 1.05 to 1.20; and a crystallite size ratio $D_{110}$(whole goethite particle)/$D_{110}$(goethite seed crystal particle) of preferably 1.02 to 1.10.

The existence amount of Co contained in the seed crystal portion is preferably 75 to 95, more preferably 80 to 90 based on total Co contained in whole spindle-shaped goethite particle, assuming that the existence amount of total Co is 100. The existence amount of Co contained in the surface layer portion is preferably 103 to 125, more preferably 106 to 120 based on total Co contained in whole spindle-shaped goethite particle.

Meanwhile, the "surface layer portion" means a goethite layer formed by the crystal growth on the goethite seed crystal particle after the addition of the Al compound during the growth reaction. More specifically, the surface layer portion is a portion extending inwardly from the outermost surface of each goethite particle which contains Fe in an amount of 50 to 60% by weight based on whole Fe contained in the goethite particle. Aluminum is contained only in the surface layer portion. The Al content is usually 5 to 10 atm % based on whole Fe.

The spindle-shaped goethite particles are produced by first forming spindle-shaped goethite seed crystal particles and then growing a goethite layer on the surface of respective goethite seed crystal particles.

The production conditions of spindle-shaped goethite seed crystal particles are as follows. That is, upon the production of the spindle-shaped goethite seed crystal particles by reacting an aqueous ferrous salt solution with a mixed aqueous alkali solution of an aqueous alkali carbonate solution and an aqueous alkali hydroxide solution to form a water suspension containing a ferrous-containing precipitate; aging the resultant water suspension in a non-oxidative atmosphere; and then passing an oxygen-containing gas through the water suspension to conduct an oxidation reaction thereof, a Co compound is added in an amount of from 0.5 to less than 8 atm % (calculated as Co) based on whole Fe, to the water suspension containing the ferrous-containing precipitate during the aging but prior to the elapse of half a period of the whole aging time before initiation of the oxidation reaction, and then the oxidation reaction is conducted such that usually 40 to 50% of whole $Fe^{2+}$ is oxidized.

The aging of the water suspension in a non-oxidative atmosphere may be suitably conducted at a temperature of usually 40 to 80° C. The aging time is usually 30 to 300 minutes.

In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing ratio between these aqueous solutions (% calculated as normality) is adjusted such that the concentration of the aqueous alkali hydroxide solution is preferably 10 to 40%, more preferably 15 to 35% (calculated as normality).

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5, calculated as the equivalent ratio of alkali contained therein to whole Fe contained in the aqueous ferrous salt solution.

The ferrous iron concentration of the solution obtained after mixing the aqueous ferrous salt solution with the mixed aqueous alkali solution is preferably 0.1 to 1.0 mol/liter, more preferably 0.2 to 0.8 mol/liter.

The pH value of the water suspension used in the production reaction of the spindle-shaped goethite seed crystal particles is preferably 8.0 to 11.5, more preferably 8.5 to 11.0.

The production reaction of the spindle-shaped goethite seed crystal particles is conducted by the oxidation reaction, i.e., by passing an oxygen-containing gas such as air through the solution. The superficial velocity of the oxygen-containing gas is preferably 0.5 to 3.5 cm/s, more preferably 1.0 to 3.0 cm/s.

Here, the "superficial velocity" means an amount of the oxygen-containing gas passed per unit sectional area (bottom sectional area of a cylindrical reactor where the pore diameter and pore number of a perforated plate are ignored; unit: cm/sec).

The production reaction of the spindle-shaped goethite seed crystal particles may be sufficiently conducted at a temperature of not more than 80° C. The reaction temperature is preferably 45 to 55° C.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging before initiation of the oxidation reaction.

The amount of the Co compound added is in the range of from 0.5 to less than 8 atm % based on whole Fe contained in the spindle-shaped goethite particles as a final product.

The pH value of the water suspension used in the growth reaction of the goethite layer is usually 8.0 to 11.5, preferably 8.5 to 11.0.

The growth of the goethite layer is conducted by the oxidation reaction, i.e., by passing an oxygen-containing gas such as air though the water suspension. The superficial velocity of the oxygen-containing gas used in the growth reaction of the goethite layer is preferably larger than that used in the production reaction of the seed crystal particles.

The growth reaction of the goethite layer may be sufficiently conducted at a temperature of usually not more than 80° C. at which goethite particles can be produced. The growth reaction temperature is preferably 45 to 55° C.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the Al compound may be added simultaneously with passing the oxygen-containing gas through the water suspension preferably at a higher superficial velocity than that used in the production reaction of the seed crystal particles. When the addition of the Al compound requires a long period of time, the oxygen-containing gas may be replaced with a nitrogen-containing gas so as not to accelerate the oxidation reaction.

The amount of the Al compound added is usually from 5 to 10 atm % based on whole Fe contained in the spindle-shaped goethite particles as a final product.

Goethite Particles (E):

The goethite particles (E) are spindle-shape goethite particles containing Co in an amount of from usually 0.5 to less than 8 atm % based on whole Fe, and Al in an amount of usually 5 to 10 atm % based on whole Fe, and having an average major axial length of usually 0.18 to 0.30 $\mu$m; a size distribution (standard deviation/major axial length) of usually not more than 0.22; an average minor axial length of usually 0.025 to 0.045 $\mu$m; and an average aspect ratio of usually 5:1 to 10:1.

The spindle-shaped goethite particles have a BET specific surface area of preferably 100 to 150 $m^2/g$.

The spindle-shaped goethite particles have a crystallite size ratio $D_{020}/D_{110}$ of preferably 1.8 to 2.4; a crystallite size $D_{020}$ of preferably 200 to 280 Å: and a crystallite size $D_{110}$ of preferably 100 to 140 Å.

The spindle-shaped goethite particles are each constituted by a seed crystal portion and a surface layer portion. Cobalt is contained in both the seed crystal and surface layer portions, while aluminum is contained only in the surface layer portion.

Here, the "seed crystal portion" means a goethite seed crystal particle produced by oxidizing a part of the ferrous salt added, prior to the addition of the Al compound. More specifically, the seed crystal portion is a portion having a specific weight percentage of Fe determined by the oxidation percentage of $Fe^{2+}$, preferably a portion extending outwardly from the center of each goethite particle and corresponding to usually 40 to 50% by weight of the goethite particle.

The spindle-shaped goethite particles have a crystallite size ratio $D_{020}$(whole goethite particle)/$D_{020}$(goethite seed crystal particle) of preferably 1.05 to 1.20; and a crystallite size ratio $D_{110}$ (whole goethite particle)/$D_{110}$(goethite seed crystal particle) of preferably 1.02 to 1.10.

The existence amount of Co contained in the seed crystal portion is preferably 75 to 95, more preferably 80 to 90 based on total Co contained in whole spindle-shaped goethite particle, assuming that the existence amount of total Co is 100. The existence amount of Co contained in the surface layer portion is preferably 103 to 125, more preferably 106 to 120 based on total Co contained in whole spindle-shaped goethite particle.

Meanwhile, the "surface layer portion" means a goethite layer formed by the crystal growth on the goethite seed crystal particle after the addition of the Al compound during the growth reaction. More specifically, the surface layer portion is a portion extending inwardly from the outermost surface of each goethite particle which contains Fe in an amount of 50 to 60% by weight based on whole Fe contained in the goethite particle. Aluminum is contained only in the surface layer portion. The Al content is usually 5 to 10 atm % based on whole Fe.

Next, the process for producing the spindle-shaped goethite particles is described below.

The spindle-shaped goethite particles are produced by first forming spindle-shaped goethite seed crystal particles and then growing a goethite layer on the surface of respective goethite seed crystal particles.

The production conditions of the spindle-shaped goethite seed crystal particles are as follows. That is, upon the production of the spindle-shaped goethite seed crystal particles by reacting an aqueous ferrous salt solution with a mixed aqueous alkali solution of an aqueous alkali carbonate solution and an aqueous alkali hydroxide solution to form a water suspension containing a ferrous-containing precipitate; aging the resultant water suspension in a non-oxidative atmosphere; and then passing an oxygen-containing gas through the water suspension to conduct an oxidation reaction thereof, a Co compound is added in an amount of from 0.5 to less than 8 atm % (calculated as Co) based on whole Fe, to the water suspension containing the ferrous-containing precipitate during the aging but prior to the elapse of half a period of the whole aging time before initiation of the oxidation reaction, and then the oxidation reaction is conducted such that usually 40 to 50% of whole $Fe^{2+}$ is oxidized.

The aging of the water suspension in a non-oxidative atmosphere may be suitably conducted at a temperature of usually 40 to 80° C. The aging time is usually 30 to 300 minutes.

In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing ratio between these aqueous solutions (% calculated as normality) is adjusted such that the concentration of the aqueous alkali hydroxide solution is preferably 10 to 40%, more preferably 15 to 35% (calculated as normality).

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

The amount of the mixed aqueous alkali solution used is usually 1.3 to 3.5, preferably 1.5 to 2.5, calculated as the equivalent ratio of alkali contained therein to whole Fe contained in the aqueous ferrous salt solution.

The ferrous iron concentration of the solution obtained after mixing the aqueous ferrous salt solution with the mixed aqueous alkali solution is preferably 0.1 to 1.0 mol/liter, more preferably 0.2 to 0.8 mol/liter.

The pH value of the water suspension used in the production reaction of the spindle-shaped goethite seed crystal particles is preferably 8.0 to 11.5, more preferably 8.5 to 11.0.

The production reaction of the spindle-shaped goethite seed crystal particles is conducted by the oxidation reaction, i.e., by passing an oxygen-containing gas such as air through the solution. The superficial velocity of the oxygen-containing gas is preferably 0.5 to 3.5 cm/s, more preferably 1.0 to 3.0 cm/s. Here, the "superficial velocity" means an amount of the oxygen-containing gas passed per unit sectional area (bottom sectional area of a cylindrical reactor where the pore diameter and pore number of a perforated plate are ignored; unit: cm/sec).

The production reaction of the spindle-shaped goethite seed crystal particles may be sufficiently conducted at a temperature of not more than 80° C. The reaction temperature is preferably 45 to 55° C.

As the Co compound added in the production reaction of the spindle-shaped goethite seed crystal particles, there may be used cobalt sulfate, cobalt chloride, cobalt nitrate or the like. These Co compounds may be used singly or in the form of a mixture of any two or more thereof. The Co compound is added to the water suspension containing the ferrous-containing precipitate during the aging before initiation of the oxidation reaction.

The amount of the Co compound added is in the range of usually from 0.5 to less than 8 atm % based on whole Fe contained in the spindle-shaped goethite particles as a final product.

The pH value of the water suspension used in the growth reaction of the goethite layer is usually 8.0 to 11.5, preferably 8.5 to 11.0.

The growth of the goethite layer is conducted by the oxidation reaction, i.e., by passing an oxygen-containing gas such as air though the water suspension.

The superficial velocity of the oxygen-containing gas used in the growth reaction of the goethite layer is preferably larger than that used in the production reaction of the seed crystal particles.

The growth reaction of the goethite layer may be sufficiently conducted at a temperature of usually not more than 80° C. at which goethite particles can be produced.

As the Al compound added in the growth reaction of the goethite layer, there may be used acid salts such as aluminum sulfate, aluminum chloride and aluminum nitrate; and aluminates such as sodium aluminate, potassium aluminate and ammonium aluminate. These Al compounds may be used singly or in the form of a mixture of any two or more thereof.

In the growth reaction of the goethite layer, the Al compound may be added simultaneously with passing the oxygen-containing gas through the water suspension preferably at a higher superficial velocity than that used in the production reaction of the seed crystal particles. When the addition of the Al compound requires a long period of time, the oxygen-containing gas may be replaced with a nitrogen-containing gas so as not to accelerate the oxidation reaction.

The amount of the Al compound added is usually 5 to 10 atm % based on whole Fe contained in the spindle-shaped goethite particles.

Examples of the hematite particles as starting materials are as follows.

Hematite Particles (A):

The hematite particles (A) used in the present invention are those showing an acicular shape, and having an average major axial diameter of usually 0.05 to 0.38 $\mu$m, preferably 0.05 to 0.28 $\mu$m; an aspect ratio of usually 5:1 to 15:1, preferably 5:1 to 10:1; a BET specific surface area of preferably 30 to 150 $m^2$/g; a Co content of preferably 0.5 to 45 atm % based on whole Fe; an Al content of preferably 5 to 20 atm % based on whole Fe; and a rare earth element in an amount of preferably 1 to 15 atm % based on whole Fe.

The granulated product of hematite particles are produced by treating the granulated product of the goethite particles with anti-sintering agent, and then heat-treating at a temperature of usually 400 to 850° C.

As the anti-sintering agent, there may be used rare earth compounds. Examples of the suitable rare earth compounds may include compounds containing at least one element selected from the group consisting of scandium, yttrium, lanthanum, cerium, praseodymium, neodymium and samarium. The rare earth compounds may be in the form of chlorides, sulfates, nitrates or the like. The coating of the rare earth compound as anti-sintering agent may be conducted by either wet or dry method. Of these methods, the use of wet coating method is preferred.

The amount of the rare earth compound used is preferably 1 to 15 atm % based on whole Fe.

After the heat-treatment, the obtained hematite particles may be washed in order to remove impurity salts such as $Na_2SO_4$ therefrom. In this case, the washing is preferably conducted so as to remove only undesired impurity salts without elution of the anti-sintering agent coated. More specifically, the washing can be effectively performed under a high pH condition in order to remove cationic impurities, and under a low pH condition in order to remove anionic impurities.

Hematite Particles (B):

The spindle-shaped hematite particles (B) used in the present invention are spindle-shaped hematite particles containing Co in an amount of usually from 0.5 to less than 6 atm %, preferably from 0.5 to less than 5 atm % based on whole Fe contained in the spindle-shaped hematite particles; Al in an amount of usually from more than 10 to less than 20 atm %, preferably from 10.5 to 18 atm % based on whole Fe contained in the spindle-shaped hematite particles; a rare earth element in an amount of usually from 1.5 to 5 atm %, preferably from 2.0 to 4.8 atm % based on whole Fe contained in the spindle-shaped hematite particles, and having an atomic ratio of Al to Co of usually from more than 2 to 4, preferably from 2.10 to 3.90.

The spindle-shaped hematite particles have an average major axial diameter of usually 0.05 to 0.17 $\mu$m; a size distribution (standard deviation/average major axial diameter) of usually not more than 0.22; and an aspect ratio of usually from more than 6:1 to less than 10:1.

It is preferred that the size distribution of the spindle-shaped hematite particles is as small as possible. Although the lower limit of the size distribution is not particularly restricted, in the consideration of industrial productivity, the size distribution is more preferably about 0.08 to about 0.12.

The spindle-shaped hematite particles of the present invention have a BET specific surface area of preferably 40 to 70 $m^2$/g.

The spindle-shaped hematite particles have a crystallite size $D_{104}$ of preferably 100 to 140 Å; a crystallite size $D_{110}$ of preferably 200 to 300 Å; and a crystallite size ratio $D_{110}/D_{104}$ of preferably 2.0 to 4.0, more preferably 2.0 to 3.0.

The spindle-shaped hematite particles are each constituted by a seed crystal portion, an intermediate layer portion and an outermost layer portion. Cobalt is present in both the seed crystal and intermediate layer portions, while aluminum is present only in the intermediate layer portion and the rare earth element is present only in the outermost layer portion. Here, the "seed crystal portion" of each hematite particle is the same as the seed crystal portion of the above goethite particle. The seed crystal portion is preferably a portion extending outwardly from the center of each hematite particle, which corresponds to the portion containing Fe in an amount of usually 40 to 50% by weight based on whole Fe contained in each hematite particle. The intermediate layer portion of each hematite particle is the same as the surface layer portion of the above goethite particle. The intermediate layer portion is preferably a portion extending inwardly from the inner surface of the rare earth element-containing outermost layer up to the outer surface of the seed crystal portion, which corresponds to a portion containing Fe in an amount of usually 50 to 60% by weight based on whole Fe contained in each hematite particle.

The existence amounts of Co (Co concentration) contained in the seed crystal portion and the intermediate layer portion are the same as those of the seed crystal portion and the surface layer portion of the above goethite particles. Meanwhile, Co may be present in the outermost layer portion, if required. In this case, Co contained in the outermost layer portion shows different effects from those contained in the seed crystal and intermediate layer portions, i.e., contributes to control of the reducing velocity as a whole or enhance the oxidation stability of the outermost surface, etc. Also, another important role of Co is that Co coexists together with Fe within each particle, thereby directly contributing to the formation of a Co—Fe alloy in the respective layers.

Next, the process for producing the spindle-shaped hematite particles is described below.

The surface of each spindle-shaped goethite particle is preferably preliminarily coated with an anti-sintering agent prior to heat-dehydration treatment thereof.

As the anti-sintering agent, there may be used rare earth compounds. Examples of the suitable rare earth compounds may include compounds of at least one element selected from the group consisting of scandium, yttrium, lanthanum, cerium, praseodymium, neodymium and samarium. The rare earth compounds may be in the form of chlorides, sulfates, nitrates or the like. The coating of the rare earth compound as anti-sintering agent may be conducted by either wet or dry method. Of these methods, the use of wet-coating method is preferred.

The amount of the rare earth compound used is preferably 1.5 to 5 atm %, more preferably 2.0 to 4.8 atm % (calculated as rare earth element) based on whole Fe.

By preliminarily coating the surface of each goethite particle with the anti-sintering agent, it is possible not only to inhibit the sintering of each particle and sintering between particles, but also to allow the spindle-shape hematite particles to retain the particle shape and aspect ratio of the spindle-shaped goethite particles, thereby ensuring the production of individual spindle-shaped magnetic metal particles containing iron as a main component which can retain the shape and aspect ratio of the raw spindle-shaped goethite particles.

The granulated product of the spindle-shaped goethite particles surface-coated with the anti-sintering agent may be heat-treated at a temperature of usually 650 to 800° C. in a non-reducing atmosphere. In this case, the heat-treatment is preferably conducted such that the ratio of crystallite size $D_{104}$ of the obtained granulated product of the spindle-shaped hematite particles to crystallite size $D_{110}$ of the spindle-shaped goethite particles [(crystallite size ratio of $D_{104}$(hematite)/$D_{110}$(goethite))] is within the range of preferably 1.0 to 1.3.

After the heat-treatment, the obtained hematite particles may be rinsed in order to remove impurity salts such as $Na_2SO_4$ therefrom. In this case, the rinsing is preferably conducted so as to remove only undesired impurity salts without elution of the anti-sintering agent coated. More specifically, the rinsing can be effectively performed under a high pH condition in order to remove cationic impurities, and under a low pH condition in order to remove anionic impurities.

Hematite Particles (C):

The spindle-shaped hematite particles (C) used in the present invention those having an average major axial diameter of usually 0.05 to 0.17 μm; a size distribution (standard deviation/average major axial diameter) of usually not more than 0.22, and an aspect ratio of usually 4:1 to 9:1.

The spindle-shaped hematite particles have a BET specific surface area of preferably from 35 to less than 60 m²/g.

The spindle-shaped hematite particles have a crystallite size $D_{104}$ of preferably 120 to 160 Å; a crystallite size $D_{110}$ of preferably 200 to 300 Å; and a crystallite size ratio $D_{110}/D_{104}$ of preferably 1.8 to 2.2.

The spindle-shaped hematite particles are each constituted by a seed crystal portion, an intermediate layer portion and an outermost layer portion. Cobalt is contained in both the seed crystal and intermediate layer portions, while aluminum is contained only in the intermediate layer portion and the rare earth element is contained only in the outermost layer portion. Here, the "seed crystal portion" of each hematite particle is the same as the seed crystal portion of the above goethite particle. The seed crystal portion is preferably a portion extending outwardly from the center of each hematite particle which corresponds to the portion containing Fe in an amount of usually 30 to 50% by weight based on whole Fe contained in each hematite particle. The intermediate layer portion of each hematite particle is the same as the surface layer portion of the above goethite particle. The intermediate layer portion is preferably a portion extending inwardly from the inner surface of the rare earth-containing outermost layer up to the outer surface of the seed crystal portion which corresponds to a portion containing Fe in an amount of usually 50 to 70% by weight based on whole Fe contained in each hematite particle.

Next, the process for producing the spindle-shaped hematite particles is described below.

In the present invention, the surface of each of the above spindle-shaped goethite particles is preferably preliminarily coated with an anti-sintering agent prior to heat-dehydration treatment thereof. Then, the granulated product of the coated spindle-shaped goethite particles are heat-treated at a temperature of usually 650 to 800° C. in a non-reducing atmosphere, thereby obtaining granulated product of the spindle-shaped hematite particles.

As the anti-sintering agent, there may be used rare earth compounds. Examples of the suitable rare earth compounds may include compounds of at least one element selected from the group consisting of scandium, yttrium, lanthanum, cerium, praseodymium, neodymium and samarium. The rare earth compounds may be in the form of chlorides, sulfates, nitrates or the like. The coating with the rare earth compound as anti-sintering agent may be conducted by either wet or dry method. Of these methods, the use of wet coating method is preferred.

The amount of the rare earth compound used is preferably 1.5 to 5 atm % (calculated as rare earth element) based on whole Fe.

By preliminarily coating the surface of each goethite particle with the anti-sintering agent, it is possible not only to inhibit the sintering of each particle and sintering between particles, but also to allow the obtained spindle-shape hematite particles to retain the particle shape and aspect ratio of the spindle-shaped goethite particles, thereby ensuring the production of individual spindle-shaped magnetic metal particles containing iron as a main component which can also retain the shape and aspect ratio of the original spindle-shaped goethite particles.

When the granulated product of the spindle-shaped goethite particles surface-coated with the anti-sintering agent is heat-treated at a temperature of 650 to 800° C. in a non-reducing atmosphere, the heat-treatment is preferably conducted such that the ratio of crystallite size $D_{104}$ of the obtained granulated product of the spindle-shaped hematite particles to the crystallite size $D_{110}$ of the spindle-shaped goethite particles [crystallite size ratio $D_{104}$(hematite)/$D_{110}$ (goethite)] falls within the range of preferably 1.0 to 1.3.

After the heat-treatment, the obtained granulated product of the hematite particles may be washed in order to remove impurity salts such as $Na_2SO_4$ therefrom. In this case, the washing is preferably conducted so as to remove only undesired impurity salts without elution of the anti-sintering agent coated. More specifically, the washing can be effectively performed under a high pH condition in order to remove cationic impurities, and under a low pH condition in order to remove anionic impurities.

The thus obtained spindle-shaped hematite particles contain Co in an amount of from usually 0.5 to less than 5 atm % based on whole Fe; Al in an amount of usually 5 to 10 atm % based on whole Fe; and a rare earth element in an amount of usually 1.5 to 5 atm % based on whole Fe.

Hematite Particles (D):

The hematite particles (D) are spindle-shaped hematite particles having a Co content of usually from 0.5 to less than 10 atm % based on whole Fe; an Al content of usually 5 to 10 atm % based on whole Fe; a rare earth content of usually 1 to 5 atm % based on whole Fe; a ratio of Al to rare earth element of usually 1.5 to 5 (calculated as atm % of the respective elements based on Fe); an average major axial length of usually 0.17 to 0.28 μm; a size distribution (standard deviation/major axial length) of usually not more than 0.20; an average minor axial length of usually 0.022 to 0.035 μm; an average aspect ratio of usually 5:1 to 10:1; and a crystallite size ratio $D_{110}/D_{104}$ of usually 2.0 to 4.0.

The spindle-shaped hematite particles have a BET specific surface area of preferably 30 to 70 m²/g, more preferably 35 to 65 m²/g.

The spindle-shaped hematite particles have a crystallite size ratio $D_{110}/D_{104}$ of preferably 2.0 to 4.0; a crystallite size $D_{104}$ of preferably 100 to 150 Å; and a crystallite size $D_{110}$ of preferably 200 to 300 Å.

The spindle-shaped hematite particles are each constituted by a seed crystal portion, an intermediate layer portion and an outermost layer portion. Cobalt is contained in both the seed crystal and intermediate layer portions, while aluminum is contained only in the intermediate layer portion and the rare earth element is contained only in the outermost layer portion.

Meanwhile, if required, the outermost layer portion may further contain at least one auxiliary compound containing the other element selected from the group consisting of Al, Si, B, Ca, Mg, Ba, Sr, Co and Ni in order to enhance the anti-sintering effect and control magnetic properties. These auxiliary compounds not only have the anti-sintering effect but also control the reducing velocity, and, therefore, may be used in an appropriate combination thereof according to the requirements. However, the use of a too large amount of the auxiliary compound results in poor saturation magnetization of the obtained magnetic metal particles. Accordingly, the auxiliary compounds may be used in optimum amounts according to the selected combination.

Here, the "seed crystal portion" of each hematite particle is the same as the seed crystal portion of the above goethite particle. The seed crystal portion is preferably a portion extending outwardly from the center of each hematite particle which corresponds to the portion containing Fe in an amount of 40 to 50% by weight based on whole Fe contained in each hematite particle. The intermediate layer portion of each hematite particle is the same as the surface layer portion of the above goethite particle. The intermediate layer portion is preferably a portion extending inwardly from the inner surface of the rare earth-containing outermost layer up to the outer surface of the seed crystal portion which corresponds to a portion containing Fe in an amount of usually 50 to 60% by weight based on whole Fe contained in each hematite particle.

The existence amount of Co contained in the seed crystal portion is preferably 75 to 95, more preferably 80 to 90 based on whole Co contained in each spindle-shaped hematite particle, assuming that the existence amount of the whole Co is 100. The existence amount of Co contained in the intermediate layer portion is preferably 103 to 125, more preferably 106 to 120 based on whole Co contained in each spindle-shaped hematite particle.

The content of the Co compound is usually from 0.5 to less than 10 atm % (calculated as Co) based on whole Fe. Aluminum is contained only in the intermediate layer portion, and the Al content is usually 5 to 10 atm % based on whole Fe.

The outermost layer portion is composed of a rare earth compound. The amount of rare earth element contained in the outermost layer portion is usually 1 to 5 atm % based on whole Fe. The ratio of Al to the rare earth element is usually 1.5 to 5.

Next, the process for producing the spindle-shaped hematite particles is described below.

The granulated product of the spindle-shaped hematite particles are produced by first coating the above spindle-shaped goethite particles with the anti-sintering agent prior to the heat-dehydration treatment, and then heat-treating the granulated product of the coated spindle-shaped goethite particles in a non-reducing atmosphere.

As the anti-sintering agent, there may be used rare earth compounds. Examples of the suitable rare earth compounds may include those compounds containing at least one element selected from the group consisting of scandium, yttrium, lanthanum, cerium, praseodymium, neodymium and samarium. The rare earth compounds may be in the form of chlorides, sulfates, nitrates or the like. The coating with the rare earth compound as anti-sintering agent may be conducted by either wet or dry method. Of these methods, the use of wet coating method is preferred. The amount of the rare earth compound used is preferably 1 to 5 atm % based on whole Fe.

In the present invention, the rare earth compound may be added in such an amount that the ratio of Al to rare earth element contained in the spindle-shaped goethite particles is in the range of usually 1.5 to 5 (calculated as atm % of the respective elements based on whole Fe).

Meanwhile, if required, the spindle-shaped goethite particles may be further treated with at least one auxiliary compound containing the other element selected from the group consisting of Al, Si, B, Ca, Mg, Ba, Sr, Co and Ni in order to enhance the anti-sintering effect and control magnetic properties. These auxiliary compounds not only have the anti-sintering effect, but also control the reducing velocity and, therefore, may be used in an appropriate combination thereof according to the requirements.

By preliminarily coating the surface of each goethite particle with the anti-sintering agent, it is possible not only to inhibit the sintering of each particle and sintering between particles, but also to allow the obtained spindle-shape hematite particles to retain the particle shape and aspect ratio of the spindle-shaped goethite particles, thereby ensuring the production of the spindle-shaped magnetic metal particles containing iron as a main component which can also retain the shape and aspect ratio of the original spindle-shaped goethite particles.

When the granulated product of the spindle-shaped goethite particles coated with the anti-sintering agent may be heat-treated at a temperature of usually 650 to 800° C. in a non-reducing atmosphere, the heat-treatment is preferably conducted such that the ratio of crystallite size $D_{104}$ of the obtained granulated product of the spindle-shaped hematite particles to crystallite size $D_{110}$ of the spindle-shaped goethite particles [crystallite size ratio $D_{104}$(hematite)/$D_{110}$(goethite)] falls within the range of preferably 0.9 to 1.1.

Also, after the heat-treatment, the obtained granulated product of the hematite particles may be washed in order to remove impurity salts such as $Na_2SO_4$ therefrom. In this case, the washing is preferably conducted so as to remove only the undesired impurity salts without elution of the anti-sintering agent coated.

More specifically, the washing can be effectively performed under a high pH condition in order to remove cationic impurities, and under a low pH condition in order to remove anionic impurities.

Hematite Particles (E):

The hematite particles (E) are spindle-shaped hematite particles having a Co content of from usually 0.5 to less than 10 atm % based on whole Fe; an Al content of usually 5 to 10 atm % based on whole Fe; a rare earth content of usually 1 to 5 atm % based on whole Fe; a ratio of Al to rare earth element of usually 1.5 to 5 (calculated as atm % of the respective elements based on Fe); an average major axial length of usually 0.17 to 0.28 μm; a size distribution (standard deviation/major axial length) of usually not more than 0.20; an average minor axial length of usually 0.022 to 0.035 μm; an average aspect ratio of usually 5:1 to 10:1; and a crystallite size ratio $D_{110}/D_{104}$ of usually 2.0 to 4.0.

The spindle-shaped hematite particles have a BET specific surface area of preferably 30 to 70 m²/g, more preferably 35 to 65 m²/g.

The spindle-shaped hematite particles (E) have a crystallite size $D_{104}$ of preferably 100 to 150 Å; and a crystallite size $D_{110}$ of preferably 200 to 300 Å.

The spindle-shaped hematite particles (E) are each constituted by a seed crystal portion, an intermediate layer portion and an outermost layer portion. Cobalt is contained in both the seed crystal and intermediate layer portions, while aluminum is contained only in the intermediate layer portion and the rare earth element is contained only in the outermost layer portion.

Meanwhile, if required, the outermost layer portion may further contain at least one auxiliary compound containing the other element selected from the group consisting of Al, Si, B, Ca, Mg, Ba, Sr, Co and Ni in order to enhance the anti-sintering effect and control magnetic properties. These auxiliary compounds not only have the anti-sintering effect but also control the reducing velocity and, therefore, may be used in an appropriate combination thereof according to the requirements.

Here, the "seed crystal portion" of each hematite particle is the same as the seed crystal portion of the above goethite particle. The seed crystal portion is preferably a portion extending outwardly from the center of each hematite particle which corresponds to the portion containing Fe in an amount of 40 to 50% by weight based on whole Fe contained in each hematite particle. The intermediate layer portion of each hematite particle is the same as the surface layer portion of the above goethite particle. The intermediate layer portion is preferably a portion extending inwardly from the inner surface of the rare earth-containing outermost layer up to the outer surface of the seed crystal portion which corresponds to a portion containing Fe in an amount of usually 50 to 60% by weight based on whole Fe contained in each hematite particle.

The existence amount of Co contained in the seed crystal portion is preferably 75 to 95, more preferably 80 to 90 based on whole Co contained in each spindle-shaped hematite particle, assuming that the existence amount of the whole Co is 100. The existence amount of Co contained in the intermediate layer portion is preferably 103 to 125, more preferably 106 to 120 based on whole Co contained in each spindle-shaped hematite particle.

The content of the Co compound is usually from 0.5 to less than 10 atm % (calculated as Co) based on whole Fe. Aluminum is contained only in the intermediate layer portion, and the Al content is usually 5 to 10 atm % based on whole Fe.

The outermost layer portion is composed of a rare earth compound. The amount of rare earth element contained in the outermost layer portion is usually 1 to 5 atm % based on whole Fe. The ratio of Al to the rare earth element is usually 1.5 to 5.

Next, the process for producing the spindle-shaped hematite particles is described below.

The surfaces of the above spindle-shaped goethite particles are coated with the anti-sintering agent prior to the heat-dehydration treatment.

As the anti-sintering agent, there may be used rare earth compounds. Examples of the suitable rare earth compounds may include those compounds containing at least one element selected from the group consisting of scandium, yttrium, lanthanum, cerium, praseodymium, neodymium and samarium. The rare earth compounds may be in the form of chlorides, sulfates, nitrates or the like. The coating with the rare earth compound as anti-sintering agent may be conducted by either wet or dry method. Of these methods, the use of wet coating method is preferred.

The amount of the rare earth compound used is preferably 1 to 5 atm % based on whole Fe.

The rare earth compound may be added in such an amount that the ratio of Al to rare earth element contained in the spindle-shaped goethite particles is in the range of usually 1.5 to 5 (calculated as atm % of the respective elements based on whole Fe).

Meanwhile, if required, the spindle-shaped goethite particles may be further treated with at least one auxiliary compound containing the other element selected from the group consisting of Al, Si, B, Ca, Mg, Ba, Sr, Co and Ni in order to enhance the anti-sintering effect and control magnetic properties. These auxiliary compounds not only have the anti-sintering effect but also control the reducing velocity and, therefore, may be used in an appropriate combination thereof according to the requirements. However, the use of a too large amount of the auxiliary compound results in poor saturation magnetization of the obtained magnetic metal particles. Accordingly, the auxiliary compounds may be used in optimum amounts according to the selected combination.

By preliminarily coating the surface of each goethite particle with the anti-sintering agent, it is possible not only to inhibit the sintering of each particle and sintering between particles, but also to allow the obtained spindle-shape hematite particles to retain the particle shape and aspect ratio of the spindle-shaped goethite particles, thereby ensuring the production of individual spindle-shaped magnetic metal particles containing iron as a main component which can also retain the shape and aspect ratio of the original spindle-shaped goethite particles.

When the granulated product of the spindle-shaped goethite particles coated with the anti-sintering agent may be heat-treated at a temperature of usually 650 to 800° C. in a non-reducing atmosphere, the heat-treatment is preferably conducted such that the ratio of crystallite size $D_{104}$ of the obtained granulated product of the spindle-shaped hematite particles to the crystallite size $D_{110}$ of the spindle-shaped goethite particles [crystallite size ratio $D_{104}$(hematite)/$D_{110}$(goethite)] falls within the range of preferably 0.9 to 1.1.

Also, after the heat-treatment, the obtained granulated product of the hematite particles may be washed in order to remove impurity salts such as $Na_2SO_4$ therefrom. In this case, the washing is preferably conducted so as to remove only the undesired impurity salts without elution of the anti-sintering agent coated.

More specifically, the washing can be effectively performed under a high pH condition in order to remove cationic impurities, and under a low pH condition in order to remove anionic impurities.

Next, the magnetic recording medium according to the present invention will be described.

The magnetic recording medium according to the present invention comprises a non-magnetic substrate, and a magnetic recording layer which is formed on the non-magnetic substrate and comprising the magnetic metal particles containing iron as a main component and a binder resin.

As the non-magnetic substrate, there may be used those ordinarily used for magnetic recording media. Examples of the non-magnetic substrates may include films of synthetic resins such as polyethylene terephthalate, polyethylene, polypropylene, polycarbonates, polyethylene naphthalate, polyamides, polyamideimides and polyimides; foils or plates of metals such as aluminum and stainless steel; or various kinds of papers. The thickness of the non-magnetic substrate varies depending upon materials used, and is usually 1.0 to 300 µm, preferably 2.0 to 200 µm.

As the non-magnetic substrate for magnetic discs,, there may be generally used a polyethylene terephthalate film having a thickness of usually 50 to 300 µm, preferably 60 to 200 µm. As the non-magnetic substrate for magnetic tapes, there may be used a polyethylene terephthalate film having a thickness of usually 3 to 100 µm, preferably 4 to 20 µm, a polyethylene naphthalate film having a thickness of usually 3 to 50 µm, preferably 4 to 20 µm, or a polyamide film having a thickness of usually 2 to 10 µm, preferably 3 to 7 µm.

As the binder resins, there may also be used those presently ordinarily used for the production of magnetic recording media. Examples of the binder resins may include vinyl chloride-vinyl acetate copolymer resins, urethane resins, vinyl chloride-vinyl acetate-maleic acid copolymer resins, urethane elastomers, butadiene-acrylonitrile copolymer resins, polyvinyl butyral, cellulose derivatives such as nitrocellulose, polyester resins, synthetic rubber-based resins such as polybutadiene, epoxy resins, polyamide resins, polyisocyanates, electron beam-curable acrylic urethane resins, or mixtures thereof.

The respective binder resins may contain a functional group such as —OH, —COOH, —$SO_3M$, —$OPO_2M_2$ and —$NH_2$ wherein M represents H, Na or K. In the consideration of the dispersibility of the magnetic metal particles containing iron as a main component in vehicle upon the production of a magnetic coating composition, the use of such binder resins containing —COOH or —$SO_3M$ as a functional group is preferred.

The thickness of the magnetic recording layer formed on the non-magnetic substrate is usually 0.01 to 5.0 µm. If the thickness is less than 0.01 µm, uniform coating may be difficult, so that unfavorable phenomenon such as unevenness on the coating surface may be observed. On the contrary, when the thickness of the magnetic recording layer is more than 5.0 µm, it may be difficult to obtain desired electromagnetic performance due to an influence of diamagnetism. The thickness of the magnetic recording layer is preferably 0.05 to 4.0 µm.

The amount of the magnetic metal particles containing iron as a main component in the magnetic recording layer is usually 5 to 2,000 parts by weight, preferably 100 to 1,000 parts by weight based on 100 parts by weight of the binder resin.

When the amount of the magnetic metal particles containing iron as a main component is less than 5 parts by weight, the magnetic metal particles containing iron as a main component may not be continuously dispersed in a coating layer due to the too small content in a magnetic coating composition, resulting in insufficient surface smoothness and strength of the obtained coating layer. When the amount of the magnetic metal particles containing iron as a main component is more than 2,000 parts by weight, the magnetic metal particles containing iron as a main component may not be uniformly dispersed in the magnetic coating composition due to the too large content as compared to that of the binder resin. As a result, when such a magnetic coating composition is coated onto the substrate, it is difficult to obtain a coating film having a sufficient surface smoothness. Further, since the magnetic metal particles containing iron as a main component cannot be sufficiently bonded together by the binder resin, the obtained coating film becomes brittle.

The magnetic recording layer may further contain various additives used in ordinary magnetic recording media such as lubricants, abrasives and anti-static agents in an amount of 0.1 to 50 parts by weight based on 100 parts by weight of the binder resin.

The magnetic recording medium of the present invention has a coercive force value of usually 111.4 to 143.2 kA/m (1,400 to 1,800 Oe), and when the magnetic coating film is oriented by applying a magnetic field of 397.9 kA/m (5 kOe) thereto, a squareness (Br/Bm) of usually not less than 0.84, an orientation property (OR) of usually not less than 2.8, a coercive force distribution (Switching Field Distribution: SFD) of usually not more than 0.53 and an oxidation stability ($\Delta Bm$) of usually not more than 8.0%.

Next, the process for producing the magnetic recording medium according to the present invention will be described.

The magnetic recording medium according to the present invention can be produced by applying a magnetic coating composition comprising the secondary agglomerates of magnetic metal particles of the present invention, binder resin and solvent onto a non-magnetic substrate to form a coating film, and then drying the coating film to form a magnetic recording layer.

As the solvent, there may be used those generally used for the production of ordinary magnetic recording media. Examples of the solvents may include methyl ethyl ketone, toluene, cyclohexane, methyl isobutyl ketone, tetrahydrofuran or mixtures thereof.

The amount of the solvent or solvents used is 65 to 1,000 parts by weight in total based on 100 parts by weight of the magnetic composite particles. When the amount of the solvent used is less than 65 parts by weight, the obtained magnetic coating composition may exhibit a too high viscosity, resulting in poor coatability thereof. When the amount of the solvent used is more than 1,000 parts by weight, a too large amount of the solvent may be volatilized upon coating which is disadvantageous from industrial viewpoints.

The point is that the secondary agglomerates obtained by deaggregating a granulated product of magnetic metal particles can be improved in kneading property with binder resin and organic solvent in a kneader, and dispersibility when the kneaded material is diluted and dispersed, so that a magnetic coating film produced using the secondary agglomerates can exhibit improved surface smoothness and squareness.

The reason why the secondary agglomerates of the present invention can exhibit an improved kneading property with binder resin and organic solvent in a kneader, is considered as follows. That is, by controlling the size and size distribution of the secondary agglomerates of magnetic metal particles to the specified ranges, the deaggregating process of the granulated product of magnetic metal particles can proceed uniformly so as to form uniform secondary agglomerates, and simultaneously the shape breakage of primary particles thereof due to partially excessive pulverization can be effectively inhibited. The above effects are apparently recognized from the below-described Examples and Comparative Examples, because the kneaded material obtained from secondary agglomerates of magnetic metal particles according to the present invention were excellent in all of gloss, elongation and flexibility and, therefore, further improved in its kneading condition. In addition, since the secondary agglomerates of magnetic metal particles according to the present invention exhibit an improved dispersibility in organic solvent upon the subsequent dilution-dispersing step, a magnetic coating film produced using such secondary agglomerates can also be considerably improved in surface smoothness and squareness.

Also, in the present invention, the granulated product of magnetic metal particles having a relatively large bulk density is deaggregated into those particles having specific particle size and size distribution. As a result, it becomes possible to obtain secondary agglomerates of magnetic metal particles capable of maintaining good storage efficiency and transport efficiency without deterioration in bulk density and flowability thereof, as well as good handing property.

Further, in the present invention, since the secondary agglomerates show an improved dispersibility in magnetic coating composition as described above, the obtained coating film can be further improved in surface smoothness and squareness. Therefore, the magnetic metal particles used in the coating film can sufficiently exhibit the inherent magnetic properties.

Thus, the secondary agglomerates of magnetic metal particles according to the present invention not only can provide a magnetic coating film having improved surface smoothness and squareness, but also exhibit high storage efficiency and transport efficiency as well as good flowability. Therefore, the secondary agglomerates of magnetic metal particles according to the present invention are suitable as magnetic particles for coating-type magnetic recording media.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axial diameter, average minor axial diameter and aspect ratio of particles are respectively expressed by averages of values measured by an electron microscope. The size distribution of the particles is expressed by the value obtained by dividing the standard deviation measured simultaneously with the above values, by the average major axial diameter.

(2) The Co, Al and rare earth contents were measured using an inductively coupled high-frequency plasma atomic emission spectroscope (SPS-4000 Model, manufactured by Seiko Denshi Kogyo Co., Ltd.).

(3) The specific surface area of particles is expressed by the value measured by BET method using "Monosorb MS-11" (manufactured by Cantachrom Co., Ltd.).

(4) The crystallite size of respective particles is expressed by the thickness of the crystallite in the direction perpendicular to each crystal plane of the respective particles measured by X-ray diffraction method. The value was calculated based on the X-ray diffraction peak curve of each crystal plane using the following Scherrer's formula:

$$\text{Crystallite size} = K\lambda/\beta \cos \theta$$

wherein $\beta$ is a true half-width of the diffraction peak which was corrected with respect to the width of machine used (unit: radian); $K$ is a Scherrer constant (=0.9); $\lambda$ is a wavelength of X-ray used (Cu K$\alpha$-ray 0.1542 nm); and $\theta$ is a diffraction angle (corresponding to a diffraction peak of each crystal plane).

(5) The magnetic properties of magnetic metal particles and magnetic coating film were measured using a vibration sample magnetometer "VSM-3S-15" (manufactured by Toei Kogyo Co., Ltd.) by applying an external magnetic field of 795.8 kA/m (10 kOe) thereto.

(6) The oxidation stability ($\Delta\sigma s$) of the saturation magnetization ($\sigma s$) of particles, and the oxidation stability ($\Delta Bm$) of saturation magnetic flux density (Bm) of the magnetic coating film were measured as follows.

The particles and the magnetic coating film were placed in a constant-temperature oven maintained at 60 and a relative humidity of 90%, and allowed to stand therein for one week to conduct an accelerated deterioration test. Thereafter, the particles and the magnetic coating film were measured to determine the saturation magnetization value and saturation magnetic flux density, respectively. The oxidation stability values $\Delta\sigma s$ and $\Delta Bm$ were calculated by dividing the difference (absolute value) between the values $\sigma s$ and $\sigma s'$ measured before and after the one-week accelerated test, and the difference (absolute value) between the values Bm and Bm' measured before and after the one-week accelerated test, by the values as and Bm measured before the accelerated test, respectively.

(7) The ignition temperature of magnetic metal particles was measured using TG/DTA measuring device "SSC5100TG/DTA22" (manufactured by Seiko Denshi Kogyo Co., Ltd.).

(8) The average particle size, repose angle, bulk density, tap density and compaction percentage of secondary agglomerates were measured using a powder tester "PT-N-Model" manufactured by Hosokawa Micron Co., Ltd. Meanwhile, the average particle size is expressed by a weight-average diameter which is a 50% value determined from weight-based integral distribution curve. Also, the bulk density and tap density were expressed by values of loose and firm densities, respectively.

(9) The gloss of surface of the coating film was measured at an incident angle of 45° using a gloss meter "UGV-5D" manufactured by Suga Testing machine Manufacturing Co., Ltd., and expressed by the percentage (%) based on a standard plate, assuming that the gloss of the standard plate is 86.3%.

Meanwhile, the magnetic coating film was prepared by conducting the following kneading step (A) and dilution-dispersing step (B).

(A) Kneading Step:

The components shown below were charged into a 88 ml twin plastomill, and kneaded together for 10 minutes.

Kneading Composition:

| | |
|---|---|
| Secondary agglomerates of magnetic metal particles | 100 parts by weight |
| Vinyl chloride resin having sodium sulfonate groups (tradename: MR110, produced by Nippon Zeon Co., Ltd.) | 15 parts by weight |
| Cyclohexanone | 35.0 parts by weight |
| Methyl ethyl ketone | 5.3 parts by weight |
| Toluene | 5.3 parts by weight |

(B) Dilution-dispersing Step:

Then, the kneaded material obtained in the above kneading step together with the other components shown below were charged into a 100-ml glass bottle, and then mixed and dispersed for 2 to 6 hours using a paint shaker (manufactured by Reddevil Co., Ltd.), thereby preparing a magnetic coating composition. The thus prepared magnetic coating composition was coated on a 25 μm-thick polyethylene telephthalate film using a 4-mil (100 μm) doctor blade to form a coating layer. The obtained coating film was then dried in a magnetic field of 397.9 kA/m (5 kOe), thereby obtaining a magnetic coating film. The thus obtained magnetic coating film was measured to determine magnetic properties thereof.

Coating Composition

| | |
|---|---|
| 1 mmφ glass beads | 530 parts by weight |
| Kneaded material of spindle-shaped magnetic metal particles containing iron as a main component | 100 parts by weight |
| Methyl ethyl ketone | 83.3 parts by weight |
| Toluene | 83.3 parts by weight |

(10) The gloss of the kneaded material was visually observed, and evaluated by classifying the observation results into the following three ranks. The Rank 3 represents the most excellent gloss.

3: Lustrous black

2: Dull black

1: Whitish black as a whole (turbid black)

(11) The elongation of the kneaded material was examined by stretching the material obtained in the kneading step (A), and evaluated by classifying the results into the following three ranks. The Rank 3 represents the most excellent elongation.

3: Elongated upon stretching

2: Readily broken upon stretching

1: Not stretchable (dry-up state)

(12) The flexibility of the kneaded material was examined by applying a pressing force to the material obtained in the kneading step (A), and evaluated by classifying the results into the following three ranks. The Rank 3 represents the most excellent flexibility.

3: Highly elastic (deformable by applying a small force)

2: Slightly elastic (deformable by applying a strong force)

1: Non-elastic and hard

Example 1

<Production of Granulated Product of Spindle-shaped Goethite Particles>

A mixed aqueous alkali solution containing sodium carbonate and aqueous sodium hydroxide solution in amounts of 25 mol and 19 mol, respectively (the concentration of sodium hydroxide is equivalent to 27.5 mol % (calculated as normality) based on mixed alkali) together with 20 liters of an aqueous ferrous sulfate solution containing 20 mol of $Fe^{2+}$ (the concentration of the mixed aqueous alkali solution is 1.725 equivalents (calculated as normality) based on the ferrous sulfate) were charged into a bubble tower and aged therein for 75 minutes. Thereafter, an aqueous cobalt sulfate solution having a concentration of 4.8 atm % (calculated as Co) based on whole Fe, was added to the bubble tower and the contents of the bubble tower were further aged for 225 minutes (percentage of time required for Co addition based on whole aging time: 25%). After aging, air was passed through the bubble tower to conduct the oxidation reaction until the oxidation percentage of $Fe^{2+}$ reached 40%, thereby producing goethite seed crystal particles. Then, an aqueous aluminum sulfate solution having a concentration of 12.0 atm % (calculated as Al) based on whole Fe, was added to conduct the oxidation reaction, and the reaction mixture was washed with water using a filter press until the electric conductivity reached 60 μS/cm, thereby obtaining a press cake.

A part of the obtained press cake was dried and pulverized by ordinary methods, thereby obtaining spindle-shaped goethite particles. It was confirmed that the obtained goethite particles were of a spindle shape, and had an average major axial diameter of 0.17 μm, an aspect ratio of 7.5:1 and a BET specific surface area of 170 m$^2$/g. Further, it was confirmed that the obtained goethite particles contained no dendritic particles, and had a Co content of 4.8 atm % based on whole Fe and an Al content of 12.0 atm % based on whole Fe, and aluminum was contained in a surface portion of each particle.

<Production of Granulated Product of Spindle-shaped Hematite Particles>

Then, the press cake containing the obtained spindle-shaped goethite particles was sufficiently dispersed in water. An aqueous neodymium nitrate solution having a concentration of 3.0 atm % (calculated as Nd) based on whole Fe was added to the dispersion, and then stirred. Further, after an aqueous sodium carbonate solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and then dried at 120° C., thereby obtaining a granulated product of the spindle-shaped goethite particles coated with the neodymium compound. It was confirmed that the obtained granulated product was of a cylindrical shape having an average diameter of 3.3 mm and an average length of 10 mm.

The goethite particles contained in the granulated product had a Co content of 4.8 atm % based on whole Fe; an Al content of 12.0 atm % based on whole Fe; and a Nd content of 3.0 atm % based on whole Fe. In addition, it was confirmed that Al was contained only in the intermediate layer portion of each spindle-shaped goethite particle, and Nd was contained only in the outer surface layer portion thereof.

The granulated product of the spindle-shaped goethite particles coated with the neodymium compound was heat-dehydrated in air at 760° C. to obtain a granulated product of spindle-shaped hematite particles having an outermost layer composed of the neodymium compound. The thus obtained granulated product was of a cylindrical shape having an average diameter of 3.1 mm and an average length of 5 mm.

The spindle-shaped hematite particles of the obtained granulated product were of a spindle shape, and had an average major axial diameter of 0.15 $\mu$m, an aspect ratio of 7.7:1 and a BET specific surface area of 45 m$^2$/g. In addition, it was confirmed that the Co content of the hematite particles was 4.8 atm % based on whole Fe; the Al content thereof was 12.0 atm % based on whole Fe; and the Nd content thereof was 3.0 atm % based on whole Fe.

<Production of Granulated Product of Spindle-shaped Magnetic Metal Particles>

Then, 100 g of the obtained cylindrical granulated product of spindle-shaped hematite particles having the outermost layer composed of the neodymium compound was charged into a fixed bed reducing apparatus having an inner diameter of 72 mm. The granulated product of spindle-shaped hematite particles was heat-reduced at 480° C. by passing a hydrogen (H$_2$) gas through the reducing apparatus at a flow rate of 35 liter/minute. After the hydrogen gas was replaced with a nitrogen gas, the obtained particles were cooled to 65° C., and then the oxygen partial pressure in the reducing apparatus was gradually increased by passing water vapor therethrough until the oxygen content therein reached the same content as in air, thereby forming a stable oxide film on the surface of each particle contained on the granulated product.

The obtained cylindrical granulated product of spindle-shaped magnetic metal particles had an average length of 3 mm (maximum length: 5 mm), an average diameter of 2.8 mm, a repose angle of 40° and a bulk density of 0.57 g/ml.

The magnetic metal particles constituting the granulated product of spindle-shaped magnetic metal particles were of a spindle shape, and had an average major axial diameter of 0.12 $\mu$m, an aspect ratio of 7.0:1, a BET specific surface area of 50 m$^2$/g and a crystallite size D$_{110}$ of 150 Å. Further, the magnetic metal particles had a uniform particle size, and contained a less amount of dendritic particles. In addition, it was confirmed that the Co content of the magnetic metal particles was 4.8 atm % based on whole Fe; the Al content thereof was 12.0 atm % based on whole Fe; the Nd content thereof was 3.0 atm % based on whole Fe; and the ratio of Al to Co was 2.50.

As to the magnetic properties of the spindle-shaped magnetic metal particles, the coercive force Hc thereof was 131.3 kA/m (1,650 Oe); the saturation magnetization value $\sigma$s thereof was 127 Am$^2$/kg (127 emu/g); the squareness ($\sigma$r/$\sigma$s) thereof was 0.49; the oxidation stability $\Delta\sigma$s of saturation magnetization thereof was 5% as an absolute value (measured value: −5%); and the ignition temperature thereof was 140° C.

<Production of Secondary Agglomerates of Magnetic Metal Particles>

Then, the obtained granulated product of the spindle-shaped magnetic metal particles was charged at a feed rate of 5 kg/minute into a rotor equipped with twin screws rotated in opposite directions at a rotating speed of 300 rpm, passed through a punching-type screen having a mesh size of 1.5 mm and being disposed underneath the rotor and then deaggregated using "RUNDERMILL RM-1" manufactured by Tokuju Kosakusho Co., Ltd., thereby obtaining secondary agglomerates of spindle-shaped magnetic metal particles.

The thus obtained secondary agglomerates of spindle-shaped magnetic metal particles had an average particle diameter of 650 $\mu$m (maximum particle diameter: 1,500 $\mu$m), and a weight-based integral size distribution as shown in FIG. 1, as well as a repose angle of 41°, a bulk density of 0.58 g/ml, a tap density of 0.67 g/ml and a compaction percentage of 13%. The changes in amounts of repose angle and bulk density between before and after deaggregating the granulated product, were +1° and +0.01 g/ml, respectively. This indicated that almost no change was caused with respect to the repose angle and bulk density. Also, the content of particles having a size of not more than 53 $\mu$m was 2.3%.

As a result of the evaluation of the obtained secondary agglomerates of spindle-shaped magnetic metal particles, it was confirmed that the gloss thereof was Rank 3; the elongation thereof was Rank 3; and the flexibility thereof was Rank 3.

Further, as to sheet magnetic characteristics of the secondary agglomerates of spindle-shaped magnetic metal particles, when the dilution-dispersing time was 2 hours, the sheet 45° gloss was 159%; the sheet squareness (Br/Bm) was 0.812; the sheet orientation property (OR) was 2.45; the sheet SFD was 0.531; and the sheet coercive force Hc was 129.9 kA/m (1,632 Oe). Also, when the dilution-dispersing time was 4 hours, the sheet 45° gloss was 177%; the sheet squareness (Br/Bm) was 0.828; the sheet orientation property (OR) was 2.61; the sheet SFD was 0.519; and the sheet coercive force Hc was 128.7 kA/m (1,617 Oe). In addition, when the dilution-dispersing time was 6 hours, the sheet 45° gloss was 182%; the sheet squareness (Br/Bm) was 0.836; the sheet orientation property (OR) was 2.74; the sheet SFD was 0.512; the sheet coercive force Hc was 128.8 kA/m (1,619 Oe); and $\Delta$Bm was 3.5% (measured value: −3.5%).

Figure 2:
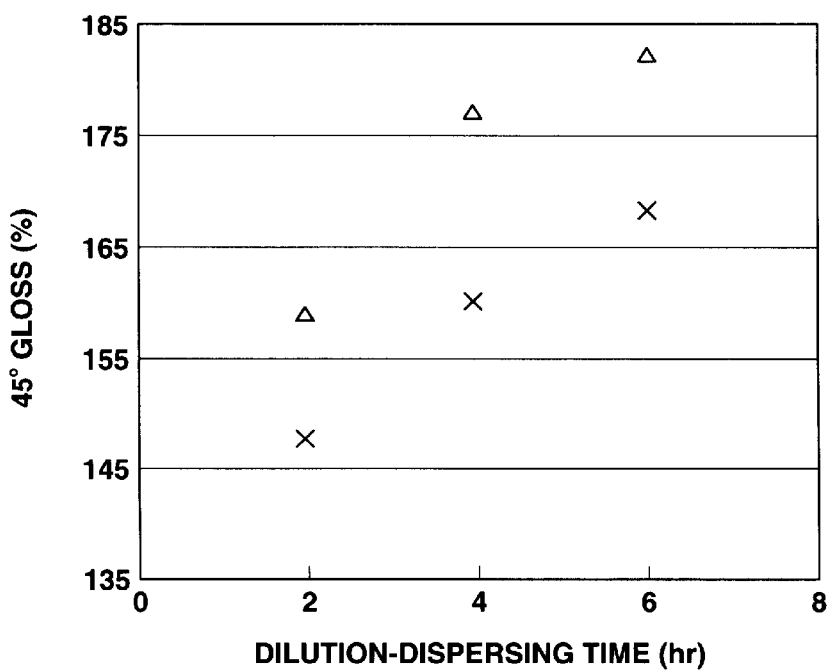
FIG. 2 is a graph showing the change in a 45° gloss depending upon a dilution-dispersing time wherein the mark: Δ represents secondary agglomerates of magnetic metal particles obtained in Example 1; and the mark: × represents the granulated product obtained in Comparative Example 1.
Figure 3:
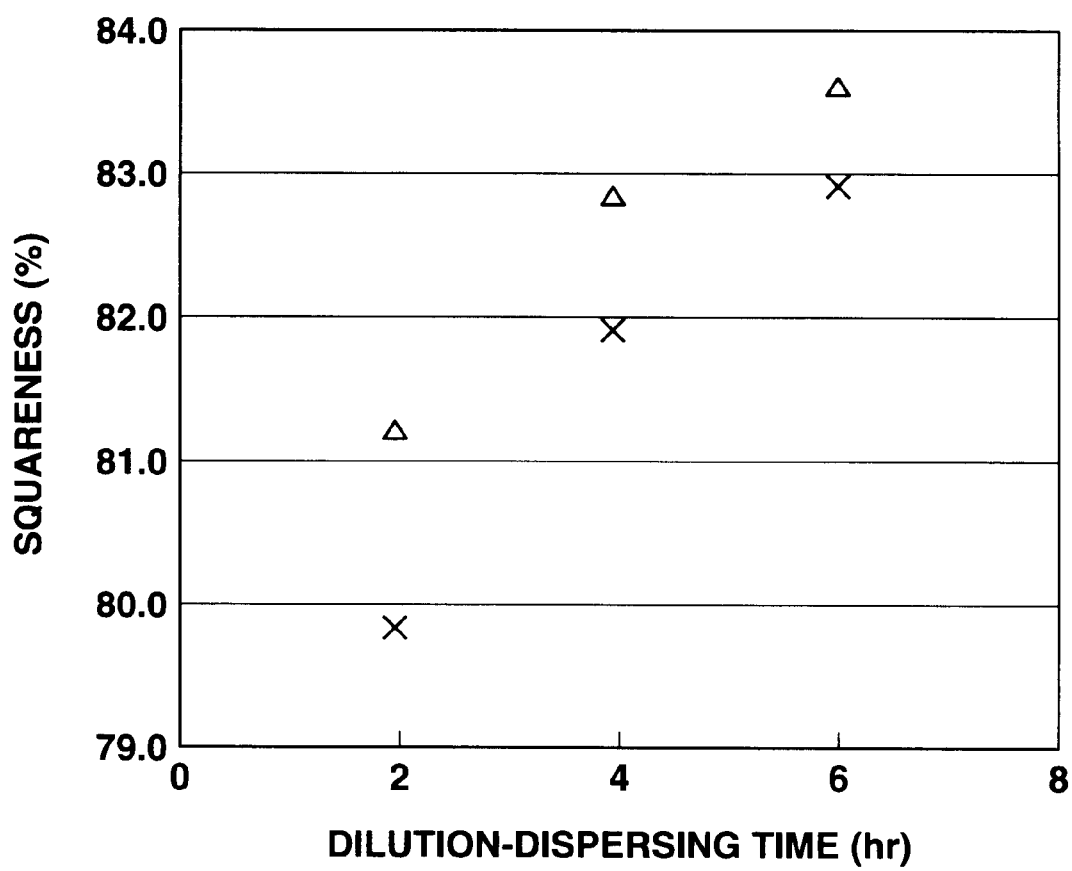
FIG. 3 is a graph showing the change in a squareness (Br/Bm) depending upon a dilution-dispersing time wherein the mark: Δ represents secondary agglomerates of magnetic metal particles obtained in Example 1; and the mark: × represents the granulated product obtained in Comparative Example 1.

Meanwhile, FIGS. 2 and 3 show a change in 45° gloss depending upon dilution-dispersing time and a change in squareness (Br/Bm) depending upon dilution-dispersing time, respectively, with respect to the secondary agglomerates of magnetic metal particles obtained in the above Example 1 and the below-mentioned Comparative Example 1. From these figures, it was apparently recognized that the secondary agglomerates of magnetic metal particles according to the present invention had a relatively high properties irrespective of the dilution-dispersing time.

Example 2

<Production of Spindle-shaped Goethite Particles>

30 liters of a mixed aqueous alkali solution containing sodium carbonate and sodium hydroxide in amounts of 25 mol and 19 mol, respectively (the concentration of sodium hydroxide is equivalent to 27.5 mol % (calculated as normality) based on mixed alkali) were charged into a bubble tower whose temperature was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) were charged into the bubble tower and the contents of the bubble tower were aged therein for one hour and 15 minutes. Thereafter, 4 liters of an aqueous cobalt sulfate solution containing 0.96 mol of $Co^{2+}$ (equivalent to 4.8 atm % (calculated as Co) based on whole Fe) was added to the bubble tower and the contents of the bubble tower were further aged for 3 hours and 45 minutes (ratio of time required for Co addition to whole aging time: 25%). After aging, air was passed through the bubble tower at a superficial velocity of 2.30 cm/s to conduct the oxidation reaction until the oxidation percentage of $Fe^{2+}$ reached 40%, thereby producing goethite seed crystal particles.

The water suspension containing the goethite seed crystal particles and having a $Fe^{2+}$ oxidation percentage of 40%, was taken out from the bubble tower, rapidly washed with a diluted aqueous acetic acid solution, filtered and then washed with water. As a result of the composition analysis of the obtained goethite seed crystal particles, it was confirmed that the Fe content was 54.2% by weight and the Co content was 2.42% by weight, and the crystallite sizes $D_{020}$ and $D_{110}$ (seed crystal particles) were 186 Å and 101 Å, respectively.

Then, one liter of an aqueous aluminum sulfate solution containing 2.4 mol of $Al^{3+}$ (equivalent to 12.0 atm % (calculated as Al) based on whole Fe) was added at a feed rate of not more than 3 ml/s to conduct the oxidation reaction, and the reaction mixture was washed with water using a filter press until the electric conductivity reached 60 µS/cm, thereby obtaining a press cake.

A part of the obtained press cake was dried and pulverized by ordinary methods, thereby obtaining spindle-shaped goethite particles. As shown in the transmission electron micrograph, the obtained goethite particles were of a spindle shape, and had an average major axial diameter of 0.173 µm, a standard deviation σ of 0.0288 µm, a size distribution (standard deviation/average major axial diameter) of 0.166, an average minor axial diameter of 0.0234 µm, an aspect ratio of 7.4:1 and a BET specific surface area of 175.7 m²/g. The obtained goethite particles contained no dendritic particles, and had as whole particles, a crystallite size $D_{020}$ of 197 Å, a crystallite size $D_{110}$ of 104 Å and a crystallite size ratio of $D_{020}/D_{110}$ of 1.89. Further, as to the relationship between the whole particles and the seed crystal particles, the crystallite size ratio of $D_{020}$(whole particles)/$D_{020}$(seed crystal particles) was 1.06, and the crystallite size ratio of $D_{110}$(whole particles)/$D_{110}$(seed crystal particles) was 1.03.

Further, the obtained goethite particles comprised 51.5% by weight of Fe, 2.61% by weight of Co and 2.98% by weight of Al. From the comparison of these values with those of the goethite seed crystal particles, it was confirmed that the Co content of the seed crystal portion of each goethite particle was 4.2 atm % based on Fe contained in the seed crystal portion. Also, it was confirmed that the existence amounts of Co contained in the seed crystal portion and surface layer portion of each goethite particle were 88 and 108, respectively, based on whole Co contained in the goethite particle, assuming that the existence amount of the whole Co based on whole Fe is 100. Furthermore, it was confirmed that the Co and Al contents of whole goethite particles was 4.8 atm % and 12.0 atm %, respectively, based on whole Fe, and Al was contained only in the surface layer portion.

<Production of Spindle-shaped Hematite Particles>

The press cake containing 1,000 g (9.22 mol as Fe) of the spindle-shaped goethite particles obtained was sufficiently dispersed in 40 liters of water. Two liters of an aqueous neodymium nitrate solution containing 121.2 g of neodymium nitrate hexahydrate (equivalent to 3.0 atm % (calculated as Nd) based on whole Fe contained in the goethite particle) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant molded product was dried at 120° C., thereby obtaining a molded product containing goethite particles coated with the neodymium compound. It was confirmed that the obtained granulated product was of a cylindrical shape having an average diameter of 3.3 mm and an average length of 10 mm.

The goethite particles obtaining by pulverizing the molded product had a Co content of 4.8 atm % based on whole Fe; an Al content of 12.0 atm % based on whole Fe; a Nd content of 3.0 atm % based on whole Fe; and an atomic ratio of Al to Co of 2.50. In addition, it was confirmed that Al was present only in the intermediate layer portion of each goethite particle, and Nd was present only in the outermost layer portion thereof.

The spindle-shaped goethite particles coated with the neodymium compound were heat-dehydrated in air at 760° C. to obtain spindle-shaped hematite particles having an outermost layer composed of the neodymium compound, such that the ratio of the crystallite size $D_{104}$ of the obtained spindle-shaped hematite particles to the crystallite size $D_{110}$ of the spindle-shaped goethite particles [(crystallite size ratio of $D_{104}$(hematite)/$D_{110}$(goethite))] was in the range of 1.0 to 1.3. The thus obtained granulated product was of a cylindrical shape having an average diameter of 3.1 mm and an average length of 5 mm.

As shown in the transmission electron micrograph, the obtained spindle-shaped hematite particles were of a spindle shape, and had an average major axial diameter of 0.158 µm, a standard deviation σ of 0.0293 µm, a size distribution (standard deviation/average major axial diameter) of 0.185, an average minor axial diameter of 0.0205 µm, an aspect ratio of 7.7:1 and a BET specific surface area of 43.5 m²/g. In addition, it was confirmed that the Co content of the hematite particles was 4.8 atm % based on whole Fe; the Al content thereof was 12.0 atm % based on whole Fe; the Nd content thereof was 3.0 atm % based on whole Fe; and the atomic ratio of Al to Co was 2.50. Further, the obtained spindle-shaped hematite particles had a crystallite size $D_{104}$ of 127 Å and a crystallite size ratio of $D_{104}$(hematite)/$D_{110}$ (goethite) of 1.22; and a crystallite size $D_{110}$ of 270 Å and a crystallite size ratio of $D_{110}$(hematite)/$D_{104}$(hematite) of 2.13.

<Production of Granulated Product of Spindle-shaped Magnetic Metal Particles>

Then, 100 g of the obtained cylindrical granulated product of spindle-shaped hematite particles having the outermost layer composed of the neodymium compound was charged into a fixed bed reducing apparatus having an inner diameter of 72 mm. The granulated product of spindle-shaped hematite particles was heat-reduced at 480° C. by passing a hydrogen ($H_2$) gas through the reducing apparatus at a flow rate of 35 liter/minute. After the hydrogen gas was replaced with a nitrogen gas, the obtained particles were cooled to 65° C., and then the oxygen partial pressure in the reducing apparatus was gradually increased by passing water vapor therethrough until the oxygen content therein reached the same content as in air, thereby forming a stable oxide film on the surface of each particle contained on the granulated product.

The obtained cylindrical granulated product of spindle-shaped magnetic metal particles had an average length of 3 mm (maximum length: 5 mm), an average diameter of 2.8 mm, a repose angle of 40° and a bulk density of 0.57 g/ml.

The magnetic metal particles constituting the granulated product of spindle-shaped magnetic metal particles were of a spindle shape, and had an average major axial diameter of 0.122 µm, a standard deviation σ of 0.0324 µm, a size distribution (standard deviation/average major axial diameter) of 0.266, an average minor axial diameter of 0.0175 µm, an aspect ratio of 7.0:1, a BET specific surface area of 51.7 m²/g and a crystallite size $D_{110}$ of 145 Å. Further, the magnetic metal particles had a uniform particle size, and contained a less amount of dendritic particles. In addition, it was confirmed that the Co content of the magnetic metal particles was 4.8 atm % based on whole Fe; the Al content thereof was 12.0 atm % based on whole Fe; the Nd content thereof was 3.0 atm % based on whole Fe; and the ratio of Al to Co was 2.50.

As to the magnetic properties of the spindle-shaped magnetic metal particles, the coercive force Hc thereof was 131.5 kA/m (1653 Oe); the saturation magnetization value σs thereof was 130.0 Am²/kg (130.0 emu/g); the squareness (σr/σs) thereof was 0.487; the oxidation stability Δσs of saturation magnetization thereof was 7.1% as an absolute value (measured value: −7.1%); and the ignition temperature thereof was 135° C.

<Production of Secondary Agglomerates of Magnetic Metal Particles>

Then, the obtained granulated product of the spindle-shaped magnetic metal particles was charged at a feed rate of 5 kg/minute into a rotor equipped with twin screws rotated in opposite directions at a rotating speed of 300 rpm, passed through a punching-type screen having a mesh size of 1.5 mm and being disposed underneath the rotor and then deaggregated using "RUNDERMILL RM-1" manufactured by Tokuju Kosakusho Co., Ltd., thereby obtaining secondary agglomerates of spindle-shaped magnetic metal particles.

The thus obtained secondary agglomerates of spindle-shaped magnetic metal particles had an average particle diameter of 650 µm (maximum particle diameter: 1500 µm), a repose angle of 41°, a bulk density of 0.58 g/ml, a tap density of 0.67 g/ml and a compaction percentage of 13%. The changes in amounts of repose angle and bulk density between before and after deaggregating the granulated product, were +1° and +0.01 g/ml, respectively. This indicated that almost no change was caused with respect to the repose angle and bulk density. Also, the content of particles having a size of not more than 53 µm was 2.3%.

As a result of the evaluation of the obtained secondary agglomerates of spindle-shaped magnetic metal particles, it was confirmed that the gloss thereof was Rank 3; the elongation thereof was Rank 3; and the flexibility thereof was Rank 3.

Further, as to sheet magnetic characteristics of the secondary agglomerates of spindle-shaped magnetic metal particles, when the dilution-dispersing time was 2 hours, the sheet 45° gloss was 157%; the sheet squareness (Br/Bm) was 0.809; the sheet orientation property (OR) was 2.45; the sheet SFD was 0.533; and the sheet coercive force Hc was 129.7 kA/m (1630 Oe). Also, when the dilution-dispersing time was 4 hours, the sheet 45° gloss was 174%; the sheet squareness (Br/Bm) was 0.826; the sheet orientation property (OR) was 2.61; the sheet SFD was 0.518; and the sheet coercive force Hc was 128.4 kA/m (1613 Oe). In addition, when the dilution-dispersing time was 6 hours, the sheet 45° gloss was 180%; the sheet squareness (Br/Bm) was 0.835; the sheet orientation property (OR) was 2.74; the sheet SFD was 0.513; the sheet coercive force Hc was 128.1 kA/m (1610 Oe); and ΔBm was 5.0% (measured value: −5.0%).

Example 3

<Production of Granulated Product of Spindle-shaped Goethite Particles>

30 liters of a mixed aqueous alkali solution containing sodium carbonate and aqueous sodium hydroxide solution in amounts of 25 mol and 19 mol, respectively (the concentration of sodium hydroxide is equivalent to 27.5 mol % (calculated as normality) based on mixed alkali) was charged into a bubble tower. The inside temperature of the tower was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) was charged into the bubble tower and the contents of the bubble tower were aged therein for 45 minutes. Thereafter, 4 liters of an aqueous cobalt sulfate solution containing 0.96 mol of $Co^{2+}$ (equivalent to 4.8 atm % (calculated as Co) based on whole Fe) was added to the bubble tower and the contents of the bubble tower were further aged for 4 hours and 15 minutes (percentage of time required for Co addition based on whole aging time: 15%). After aging, air was passed through the bubble tower at a superficial velocity of 2.50 cm/s to conduct the oxidation reaction until the oxidation percentage of $Fe^{2+}$ reached 40%, thereby producing goethite seed crystal particles.

Then, one liter of an aqueous aluminum sulfate solution containing 1.6 mol of $Al^{3+}$ (equivalent to 8.0 atm % (calculated as Al) based on whole Fe) was added at a feed rate of not more than 3 ml/s to conduct the oxidation reaction, and the reaction mixture was washed with water using a filter press until the electric conductivity reached 60 µS/cm, thereby obtaining a press cake.

A part of the obtained press cake was dried and pulverized by ordinary methods, thereby obtaining spindle-shaped goethite particles. The obtained goethite particles were of a spindle shape, and had an average major axial diameter of 0.159 µm, a standard deviation σ of 0.0306 µm, a size distribution (standard deviation/major axial diameter) of 0.192, an average minor axial diameter of 0.0248 µm, an aspect ratio of 6.4:1 and a BET specific surface area of 153.8 m²/g. The obtained goethite particles contained no dendritic particles, and had a crystallite size $D_{020}$ of 195 Å, a crystallite size $D_{110}$ of 110 Å and a crystallite size ratio $D_{020}/D_{110}$ of 1.77.

Further, it was confirmed that the obtained goethite particles had a Co content of 4.8 atm % based on whole Fe and an Al content of 8.0 atm % based on whole Fe, and Al was contained only in the surface layer portion.

<Production of Granulated Product of Spindle-shaped Hematite Particles>

Then, the press cake containing 1,000 g (9.22 mol as Fe) of the obtained spindle-shaped goethite particles was sufficiently dispersed in 40 liters of water. Two liters of an aqueous neodymium nitrate solution containing 121.2 g of neodymium nitrate hexahydrate (equivalent to 3.0 atm % (calculated as Nd) based on whole Fe contained in the goethite particles) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant product was dried at 120° C., thereby obtaining a molded product of the goethite particles coated with the neodymium compound. It was confirmed that the obtained granulated product was of a cylindrical shape having an average diameter of 3.3 mm and an average length of 10 mm.

The goethite particles obtaining by pulverizing the molded product had a Co content of 4.8 atm % based on whole Fe; an Al content of 8.0 atm % based on whole Fe; and a Nd content of 3.0 atm % based on whole Fe. In addition, it was confirmed that Al was contained only in the intermediate layer portion of each goethite particle, and Nd was contained only in the outermost layer portion thereof.

The spindle-shaped goethite particles coated with the neodymium compound were heat-dehydrated in air at 760° C. to obtain spindle-shaped hematite particles having an outermost layer composed of the neodymium compound, such that the ratio of the crystallite size $D_{104}$ of the obtained spindle-shaped hematite particles to the crystallite size $D_{110}$ of the spindle-shaped goethite particles [crystallite size ratio $D_{104}$(hematite)/$D_{110}$(goethite)] was in the range of 1.0 to 1.3. The thus obtained granulated product was of a cylindrical shape having an average diameter of 3.1 mm and an average length of 5 mm.

The obtained spindle-shaped hematite particles were of a spindle shape, and had an average major axial diameter of 0.141 μm, a standard deviation σ of 0.0304 μm, a size distribution (standard deviation/average major axial diameter) of 0.216, an average minor axial diameter of 0.0201 μm, an aspect ratio of 7.0:1 and a BET specific surface area of 38.8 $m^2$/g. In addition, it was confirmed that the Co content of the hematite particles was 4.8 atm % based on whole Fe; the Al content thereof was 8.0 atm % based on whole Fe; and the Nd content thereof was 3.0 atm % based on whole Fe. Further, the obtained spindle-shaped hematite particles had a crystallite size $D_{104}$ of 142 Å and a crystallite size ratio $D_{104}$(hematite)/$D_{110}$(goethite) of 1.29; and a crystallite size $D_{110}$ of 275 Å and a crystallite size ratio $D_{110}$(hematite)/$D_{104}$(hematite) of 1.94.

<Production of Granulated Product of Spindle-shaped Magnetic Metal Particles>

Then, the obtained granulated product of spindle-shaped hematite particles having the outermost layer composed of the neodymium compound were charged into a reducing apparatus so as to form a 7 cm-height fixed bed composed of the granulated product of spindle-shaped hematite particles therein. While passing a $H_2$ gas through the fixed bed formed in the reducing apparatus at a superficial velocity of 70 cm/s at a temperature 480° C., the inside temperature of the reducing apparatus is increased from ordinary temperature to 480° C. as a suitable reducing temperature at a temperature rising rate of 20° C./minute, and the heat-reduction of the granulated product of hematite particles is continued at the same temperature. Then, after the hydrogen gas was replaced with a nitrogen gas, the inside temperature of the reducing apparatus was cooled to 70° C. Thereafter, the oxygen partial pressure in the reducing apparatus was gradually increased while passing water vapor therethrough until the oxygen content reached the same content as in air, thereby forming a stable oxide film on the surface of each particle.

The obtained cylindrical granulated product of spindle-shaped magnetic metal particles had an average length of 3 mm (maximum length: 5 mm), an average diameter of 2.8 mm, a repose angle of 40° and a bulk density of 0.58 g/ml.

The magnetic metal particles constituting the granulated product of spindle-shaped magnetic metal particles were of a spindle shape, and had an average major axial diameter of 0.126 μm, a standard deviation σ of 0.0290 μm, a size distribution (standard deviation/average major axial diameter) of 0.230, an average minor axial diameter of 0.0198 μm, an aspect ratio of 6.4:1, a BET specific surface area of 42.5 $m^2$/g and a crystallite size $D_{110}$ of 160 Å. Further, the magnetic metal particles had a uniform particle size, and contained a less amount of dendritic particles. In addition, it was confirmed that the Co content of the magnetic metal particles was 4.8 atm % based on whole Fe; the Al content thereof was 8.0 atm % based on whole Fe; the Nd content thereof was 3.0 atm % based on whole Fe; and the ratio of Al to Co was 1.67.

As to the magnetic properties of the spindle-shaped magnetic metal particles, the coercive force Hc thereof was 133.7 kA/m (1680 Oe); the saturation magnetization value σs thereof was 127.0 $Am^2$/kg (127.0 emu/g); the squareness (σr/σs) thereof was 0.490; the oxidation stability Δσs of saturation magnetization thereof was 4.5% as an absolute value (measured value: −4.5%); and the ignition temperature thereof was 145° C.

<Production of Secondary Agglomerates of Magnetic Metal Particles>

Then, the obtained granulated product of the spindle-shaped magnetic metal particles was charged at a feed rate of 5 kg/minute into a rotor equipped with twin screws rotated in opposite directions at a rotating speed of 300 rpm, passed through a punching-type screen having a mesh size of 1.5 mm and being disposed underneath the rotor and then deaggregated using "RUNDERMILL RM-1" manufactured by Tokuju Kosakusho Co., Ltd., thereby obtaining secondary agglomerates of spindle-shaped magnetic metal particles.

The thus obtained secondary agglomerates of spindle-shaped magnetic metal particles had an average particle diameter of 650 μm (maximum particle diameter: 1500 μm), and a repose angle of 41°, a bulk density of 0.59 g/ml, a tap density of 0.68 g/ml and a compaction percentage of 14%. The changes in amounts of repose angle and bulk density between before and after deaggregating the granulated product, were +1° and +0.01 g/ml, respectively. This indicated that almost no change was caused with respect to the repose angle and bulk density. Also, the content of particles having a size of not more than 53 μm was 2.2%.

As a result of the evaluation of the obtained secondary agglomerates of spindle-shaped magnetic metal particles, it was confirmed that the gloss thereof was Rank 3; the elongation thereof was Rank 3; and the flexibility thereof was Rank 3.

Further, as to sheet magnetic characteristics of the secondary agglomerates of spindle-shaped magnetic metal particles, when the dilution-dispersing time was 2 hours, the sheet 45° gloss was 156%; the sheet squareness (Br/Bm) was 0.808; the sheet orientation property (OR) was 2.36; the sheet SFD was 0.556; and the sheet coercive force Hc was 130.7 kA/m (1643 Oe). Also, when the dilution-dispersing time was 4 hours, the sheet 45° gloss was 172%; the sheet squareness (Br/Bm) was 0.825; the sheet orientation property (OR) was 2.51; the sheet SFD was 0.541; and the sheet coercive force Hc was 129.5 kA/m (1627 Oe). In addition, when the dilution-dispersing time was 6 hours, the sheet 45° gloss was 179%; the sheet squareness (Br/Bm) was 0.833; the sheet orientation property (OR) was 2.64; the sheet SFD was 0.536; the sheet coercive force Hc was 129.6 kA/m (1629 Oe); and ΔBm was 3.2% (measured value: −3.2%).

Example 4

<Production of Granulated Product of Spindle-shaped Goethite Particles>

30 liters of a mixed aqueous alkali solution containing sodium carbonate and aqueous sodium hydroxide solution in amounts of 25 mol and 19 mol, respectively (the concentration of sodium hydroxide is equivalent to 27.5 mol % (calculated as normality) based on mixed alkali) was charged into a bubble tower. The inside temperature of the tower was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) was charged into the bubble tower, and the contents of the bubble tower were aged therein for 30 minutes. Thereafter, 4 liters of an aqueous cobalt sulfate solution containing 1.0 mol of $Co^{2+}$ (equivalent to 5 atm % (calculated as Co) based on whole Fe) was added to the bubble tower, and the contents of the bubble tower were further aged for 4 hours and 30 minutes (percentage of time required for Co addition based on whole aging time: 10%). After aging, air was passed through the bubble tower at a superficial velocity of 1.50 cm/s to conduct the oxidation reaction until the oxidation percentage of $Fe^{2+}$ reached 40%, thereby producing goethite seed crystal particles.

The water suspension containing the goethite seed crystal particles and having a $Fe^{2+}$ oxidation percentage of 40%, was sampled from the bubble tower, rapidly washed with a diluted aqueous acetic acid solution, filtered and then washed with water. As a result of the composition analysis of the obtained goethite seed crystal particles, it was confirmed that the Fe content was 54.00% by weight and the Co content was 2.45% by weight, and the crystallite sizes $D_{020}$ and $D_{110}$ (both seed crystal particles) were 245 Å and 125 Å, respectively.

Then, after increasing the superficial velocity of air passed to 2.30 cm/s, one liter of an aqueous aluminum sulfate solution containing 1.6 mol of $Al^{3+}$ (equivalent to 8 atm % (calculated as Al) based on whole Fe) was added at a feed rate of not more than 3 ml/s to conduct the oxidation reaction, and the reaction mixture was washed with water using a filter press until the electric conductivity reached 60 μS/cm, thereby obtaining a press cake.

A part of the obtained press cake was dried and pulverized by ordinary methods, thereby obtaining goethite particles. The obtained goethite particles were of a spindle shape, and had a BET specific surface area of 135.4 $m^2$/g; an average major axial diameter of 0.275 μm, a standard deviation σ of 0.0459 μm, a size distribution (standard deviation/major axial diameter) of 0.167, an average minor axial diameter of 0.0393 μm, and an aspect ratio of 7.0:1. The obtained goethite particles contained no dendritic particles, and had a crystallite size $D_{020}$ of 262 Å, a crystallite size $D_{110}$ of 131 Å and a crystallite size ratio $D_{020}/D_{110}$ of 2.0. In addition, as to the relationship between the crystallite size of the goethite particles and that of the seed crystal particles, the crystallite size ratio of $D_{020}$(whole goethite particles) to $D_{020}$(seed crystal particles) was 1.07, and the crystallite size ratio of $D_{110}$(whole goethite particles) to $D_{110}$(seed crystal particles) was 1.05

Further, the obtained goethite particles contained 51.5% by weight of Fe, 2.72% by weight of Co and 1.99% by weight of Al. From the comparison with the analyzed values of the goethite seed crystal particles, it was confirmed that the Co content of the seed crystal portion of each goethite particle was 4.30 atm % based on Fe contained in the seed crystal portion. Also, it was confirmed that the Co existence amounts of the seed crystal portion and surface layer portion of each goethite particle were 86.0 and 109.3 (the latter is a calculated value), respectively, based on whole Co contained in the goethite particle, assuming that the existence amount of the whole Co based on whole Fe is 100. Furthermore, it was confirmed that the Co and Al contents of whole goethite particles was 5 atm % and 8 atm %, respectively, based on whole Fe, and Al was contained only in the surface layer portion.

Then, the press cake containing 1,000 g (9.22 mol as Fe) of the obtained spindle-shaped goethite particles was sufficiently dispersed in 40 liters of water. Two liters of an aqueous neodymium nitrate solution containing 121.2 g of neodymium nitrate hexahydrate (equivalent to 3 atm % (calculated as Nd) based on whole Fe contained in the goethite particles) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant product was dried at 120° C., thereby obtaining a molded product of the goethite particles coated with the neodymium compound. The goethite particles obtaining by pulverizing the molded product had a Co content of 5 atm % based on whole Fe; an Al content of 8 atm % based on whole Fe; a Nd content of 3 atm % based on whole Fe; and an Al/Nd ratio of 2.67 (calculated as atm % of the respective elements based on whole Fe). In addition, it was confirmed that Al was contained only in the intermediate layer portion of each goethite particle, and Nd was contained only in the outermost layer portion thereof. It was confirmed that the obtained granulated product was of a cylindrical shape having an average diameter of 3.3 mm and an average length of 10 mm.

<Production of Granulated Product of Spindle-shaped Hematite Particles>

The spindle-shaped goethite particles coated with the neodymium compound were heat-dehydrated in air at 730° C. to obtain spindle-shaped hematite particles having an outermost layer composed of the neodymium compound, such that the ratio of the crystallite size $D_{104}$ of the obtained spindle-shaped hematite particles to the crystallite size $D_{110}$ of the spindle-shaped goethite particles [crystallite size ratio $D_{104}$(hematite)/$D_{110}$(goethite)] was in the range of 0.9 to 1.1. The thus obtained granulated product was of a cylindrical shape having an average diameter of 3.1 mm and an average length of 5 mm.

The obtained spindle-shaped hematite particles had an average major axial diameter of 0.241 μm, a standard deviation σ of 0.0434 μm, a size distribution (standard deviation/average major axial diameter) of 0.180, an average minor axial diameter of 0.0309 μm, an aspect ratio of 7.8:1 and a BET specific surface area of 48.5 $m^2$/g. In addition, it was confirmed that the Co content of the hematite particles was 5 atm % based on whole Fe; the Al content thereof was 8 atm % based on whole Fe; the Nd content thereof was 3 atm % based on whole Fe; and the Al/Nd ratio was 2.67. Further, the obtained spindle-shaped hematite particles had a crystallite size $D_{104}$ of 130 Å and a crystallite size ratio $D_{104}$(hematite)/$D_{110}$(goethite) of 0.99; and a crystallite size $D_{110}$ of 285 Å and a crystallite size ratio $D_{110}$ (hematite)/$D_{104}$ (hematite) of 2.19.

<Production of Granulated Product of Spindle-shaped Magnetic Metal Particles>

Then, the obtained granulated product of spindle-shaped hematite particles having the outermost layer composed of the neodymium compound were charged into a reducing apparatus so as to form a 7 cm-height fixed bed composed of the granulated product of spindle-shaped hematite particles therein. While passing a $H_2$ gas through the fixed bed formed in the reducing apparatus at a superficial velocity of 70 cm/s at a temperature of 480° C., the inside temperature of the reducing apparatus is increased from ordinary temperature to 480° C. as a suitable reducing temperature at a temperature rising rate of 20%/minute, and the heat-reduction of the granulated product of hematite particles is continued at the same temperature. Then, after the hydrogen gas was replaced with a nitrogen gas, the inside temperature of the reducing apparatus was cooled to 70° C. Thereafter, the oxygen partial pressure in the reducing apparatus was gradually increased while passing water vapor therethrough until the oxygen content reached the same content as in air, thereby forming a stable oxide film on the surface of each particle.

The obtained cylindrical granulated product of spindle-shaped magnetic metal particles had an average length of 3 mm (maximum length: 5 mm), an average diameter of 2.8 mm, a repose angle of 39° and a bulk density of 0.56 g/ml.

The magnetic metal particles constituting the granulated product of spindle-shaped magnetic metal particles were of a spindle shape, and had an average major axial diameter of 0.180 μm, a standard deviation σ of 0.042 μm, a size distribution (standard deviation/average major axial diameter) of 0.234, an average minor axial diameter of 0.0230 μm, an aspect ratio of 7.8:1, a BET specific surface area of 43.4 m²/g and a crystallite size $D_{110}$ of 155 Å. Further, the magnetic metal particles had a uniform particle size, and contained a less amount of dendritic particles. In addition, it was confirmed that the Co content of the magnetic metal particles was 5.0 atm % based on whole Fe; the Al content thereof was 8.0 atm % based on whole Fe; the Nd content thereof was 3.0 atm % based on whole Fe; and the ratio of Al to Nd was 2.67.

As to the magnetic properties of the spindle-shaped magnetic metal particles, the coercive force Hc thereof was 123.5 kA/m (1552 Oe); the saturation magnetization value σs thereof was 130.0 Am²/kg (130.0 emu/g); the squareness (σr/σs) thereof was 0.502; the oxidation stability Δσs of saturation magnetization thereof was 4.5% as an absolute value (measured value: −4.5%); and the ignition temperature thereof was 156° C.

<Production of Secondary Agglomerates of Magnetic Metal Particles>

Then, the obtained granulated product of the spindle-shaped magnetic metal particles was charged at a feed rate of 5 kg/minute into a rotor equipped with twin screws rotated in opposite directions at a rotating speed of 300 rpm, passed through a punching-type screen having a mesh size of 1.5 mm and being disposed underneath the rotor and then deaggregated using "RUNDERMILL RM-1" manufactured by Tokuju Kosakusho Co., Ltd., thereby obtaining secondary agglomerates of spindle-shaped magnetic metal particles.

The thus obtained secondary agglomerates of spindle-shaped magnetic metal particles had an average particle diameter of 650 μm (maximum particle diameter: 1500 μm), and a repose angle of 40°, a bulk density of 0.57 g/ml, a tap density of 0.66 g/ml and a compaction percentage of 14%. The changes in amounts of repose angle and bulk density between before and after deaggregating the granulated product, were +1° and +0.01 g/ml, respectively. This indicated that almost no change was caused with respect to the repose angle and bulk density. Also, the content of particles having a size of not more than 53 μm was 2.4%.

As a result of the evaluation of the obtained secondary agglomerates of spindle-shaped magnetic metal particles, it was confirmed that the gloss thereof was Rank 3; the elongation thereof was Rank 3; and the flexibility thereof was Rank 3.

Further, as to sheet magnetic characteristics of the secondary agglomerates of spindle-shaped magnetic metal particles, when the dilution-dispersing time was 2 hours, the sheet 45° gloss was 149%; the sheet squareness (Br/Bm) was 0.831; the sheet orientation property (OR) was 2.62; the sheet SFD was 0.512; and the sheet coercive force Hc was 117.1 kA/m (1471 Oe). Also, when the dilution-dispersing time was 4 hours, the sheet 45° gloss was 171%; the sheet squareness (Br/Bm) was 0.849; the sheet orientation property (OR) was 2.79; the sheet SFD was 0.498; and the sheet coercive force Hc was 115.9 kA/m (1456 Oe). In addition, when the dilution-dispersing time was 6 hours, the sheet 45° gloss was 181%; the sheet squareness (Br/Bm) was 0.858; the sheet orientation property (OR) was 2.93; the sheet SFD was 0.494; the sheet coercive force Hc was 116.0 kA/m (1458 Oe); and ΔBm was 3.2% (measured value: −3.2%).

Example 5

<Production of Granulated Product of Spindle-shaped Goethite Particles>

30 liters of a mixed aqueous alkali solution containing sodium carbonate and aqueous sodium hydroxide solution in amounts of 25 mol and 19 mol, respectively (the concentration of sodium hydroxide is equivalent to 27.5 mol % (calculated as normality) based on mixed alkali) was charged into a bubble tower. The inside temperature of the tower was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) was charged into the bubble tower, and the contents of the bubble tower were aged for 30 minutes. Thereafter, 4 liters of an aqueous cobalt sulfate solution containing 1.0 mol of $Co^{2+}$ (equivalent to 5 atm % (calculated as Co) based on whole Fe) was added to the bubble tower, and the contents of the bubble tower were further aged for 4 hours and 30 minutes (percentage of time required for Co addition based on whole aging time: 10%). After aging, air was passed through the bubble tower at a superficial velocity of 1.50 cm/s to conduct the oxidation reaction until the oxidation percentage of $Fe^{2+}$ reached 40%, thereby producing goethite seed crystal particles.

The water suspension containing the goethite seed crystal particles and having a $Fe^{2+}$ oxidation percentage of 40%, was sampled from the bubble tower, rapidly washed with a diluted aqueous acetic acid solution, filtered and then washed with water. As a result of the composition analysis of the obtained goethite seed crystal particles, it was confirmed that the Fe content was 54.00% by weight and the Co content was 2.45% by weight, and the crystallite sizes $D_{020}$ and $D_{110}$ (both seed crystal particles) were 245 Å and 125 Å, respectively.

Then, after increasing the superficial velocity of air passed to 2.30 cm/s, one liter of an aqueous aluminum sulfate solution containing 1.6 mol of $Al^{3+}$ (equivalent to 8 atm % (calculated as Al) based on whole Fe) was added at a feed rate of not more than 3 ml/s to conduct the oxidation reaction, and the reaction mixture was washed with water using a filter press until the electric conductivity reached 60 µS/cm, thereby obtaining a press cake.

A part of the obtained press cake was dried and pulverized by ordinary methods, thereby obtaining goethite particles. As a result of the observation by transmission electron microscope, it was confirmed that the obtained goethite particles were of a spindle shape, and had a BET specific surface area of 135.4 m²/g; an average major axial diameter of 0.275 µm, a standard deviation σ of 0.0459 µm, a size distribution (standard deviation/major axial diameter) of 0.167, an average minor axial diameter of 0.0393 µm, and an aspect ratio of 7.0:1. The obtained goethite particles contained no dendritic particles, and had as whole particles, a crystallite size $D_{020}$ of 262 Å, a crystallite size $D_{110}$ of 131 Å and a crystallite size ratio $D_{020}/D_{110}$ of 2.0. In addition, as to the relationship between the crystallite size of the goethite particles and that of the seed crystal particles, the crystallite size ratio of $D_{020}$(whole particles) to $D_{020}$(seed crystal particles) was 1.07, and the crystallite size ratio of $D_{110}$ (whole particles) to $D_{110}$(seed crystal particles) was 1.05

Further, the obtained goethite particles contained 51.5% by weight of Fe, 2.72% by weight of Co and 1.99% by weight of Al. From the comparison with the analyzed values of the goethite seed crystal particles, it was confirmed that the Co content of the seed crystal portion of each goethite particle was 4.30 atm % based on Fe contained in the seed crystal portion. Also, it was confirmed that the Co existence amounts of the seed crystal portion and surface layer portion of each goethite particle were 86.0 and 109.3 (the latter is a calculated value), respectively, based on whole Co contained in the goethite particle, assuming that the existence amount of the whole Co based on whole Fe is 100. Furthermore, it was confirmed that the Co and Al contents of whole goethite particles was 5 atm % and 8 atm %, respectively, based on whole Fe, and Al was contained only in the surface layer portion.

Then, the press cake containing 1,000 g (9.22 mol as Fe) of the obtained spindle-shaped goethite particles was sufficiently dispersed in 40 liters of water. Two liters of an aqueous neodymium nitrate solution containing 121.2 g of neodymium nitrate hexahydrate (equivalent to 3 atm % (calculated as Nd) based on whole Fe contained in the goethite particles) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant product was dried at 120° C., thereby obtaining a molded product of the goethite particles coated with the neodymium compound. The goethite particles obtaining by pulverizing the molded product had a Co content of 5 atm % based on whole Fe; an Al content of 8 atm % based on whole Fe; a Nd content of 3 atm % based on whole Fe; and an Al/Nd ratio of 2.67 (calculated as atm % of the respective elements based on whole Fe). In addition, it was confirmed that Al was contained only in the intermediate layer portion of each goethite particle, and Nd was contained only in the outermost layer portion thereof. It was confirmed that the obtained granulated product was of a cylindrical shape having an average diameter of 3.3 mm and an average length of 10 mm.

<Production of Granulated Product of Spindle-shaped Hematite Particles>

The spindle-shaped goethite particles coated with the neodymium compound were heat-dehydrated in air at 730° C. to obtain spindle-shaped hematite particles having an outermost layer composed of the neodymium compound, such that the ratio of the crystallite size $D_{104}$ of the obtained spindle-shaped hematite particles to the crystallite size $D_{110}$ of the spindle-shaped goethite particles [crystallite size ratio $D_{104}$(hematite)/$D_{110}$(goethite)] was in the range of 0.9 to 1.1. The thus obtained granulated product was of a cylindrical shape having an average diameter of 3.1 mm and an average length of 5 mm.

As a result of the observation by transmission electron microscope, it was confirmed that the obtained spindle-shaped hematite particles had an average major axial diameter of 0.241 µm, a standard deviation σ of 0.0434 µm, a size distribution (standard deviation/average major axial diameter) of 0.180, an average minor axial diameter of 0.0309 µm, an aspect ratio of 7.8:1 and a BET specific surface area of 48.5 m²/g. In addition, it was confirmed that the Co content of the hematite particles was 5 atm % based on whole Fe; the Al content thereof was 8 atm % based on whole Fe; the Nd content thereof was 3 atm % based on whole Fe; and the Al/Nd ratio was 2.67. Further, the obtained spindle-shaped hematite particles had a crystallite size $D_{104}$ of 130 Å and a crystallite size ratio $D_{104}$(hematite)/$D_{110}$(goethite) of 0.99; and a crystallite size $D_{110}$ of 285 Å and a crystallite size ratio $D_{110}$(hematite)/$D_{104}$(hematite) of 2.19.

<Production of Granulated Product of Spindle-shaped Magnetic Metal Particles>

Then, 100 g of the obtained cylindrical granulated product of spindle-shaped hematite particles having the outermost layer composed of the neodymium compound was charged into a fixed bed reducing apparatus having an inner diameter of 72 mm. The granulated product of spindle-shaped hematite particles was heat-reduced at 480° C. by passing a hydrogen ($H_2$) gas through the reducing apparatus at a flow rate of 35 liter/minute. After the hydrogen gas was replaced with a nitrogen gas, the obtained particles were cooled to 70° C., and then the oxygen partial pressure in the reducing apparatus was gradually increased by passing water vapor therethrough until the oxygen content therein reached the same content as in air, thereby forming a stable oxide film on the surface of each particle contained on the granulated product.

The obtained cylindrical granulated product of spindle-shaped magnetic metal particles had an average length of 3 mm (maximum length: 5 mm), an average diameter of 2.8 mm, a repose angle of 39° and a bulk density of 0.56 g/ml.

The magnetic metal particles constituting the granulated product of spindle-shaped magnetic metal particles were of a spindle shape, and had an average major axial diameter of 0.178 µm, a standard deviation σ of 0.0456 µm, a size distribution (standard deviation/average major axial diameter) of 0.256, an average minor axial diameter of 0.0234 µm, an aspect ratio of 7.6:1, a BET specific surface area of 42.1 m²/g and a crystallite size $D_{110}$ of 158 Å. Further, the magnetic metal particles had a uniform particle size, and contained a less amount of dendritic particles. In addition, it was confirmed that the Co content of the magnetic metal particles was 5.0 atm % based on whole Fe; the Al content thereof was 8.0 atm % based on whole Fe; the Nd content thereof was 3.0 atm % based on whole Fe; and the ratio of Al to Nd was 2.67.

As to the magnetic properties of the spindle-shaped magnetic metal particles, the coercive force Hc thereof was 122.5 kA/m (1540 Oe); the saturation magnetization value σs thereof was 128.8 Am²/kg (128.8 emu/g); the squareness (σr/σs) thereof was 0.498; the oxidation stability Δσs of saturation magnetization thereof was 4.9% as an absolute value (measured value: −4.9%); and the ignition temperature thereof was 153° C.

<Production of Secondary Agglomerates of Magnetic Metal Particles>

Then, the obtained granulated product of the spindle-shaped magnetic metal particles was charged at a feed rate of 5 kg/minute into a rotor equipped with twin screws rotated in opposite directions at a rotating speed of 300 rpm, passed through a punching-type screen having a mesh size of 1.5 mm and being disposed underneath the rotor and then deaggregated using "RUNDERMILL RM-1" manufactured by Tokuju Kosakusho Co., Ltd., thereby obtaining secondary agglomerates of spindle-shaped magnetic metal particles.

The thus obtained secondary agglomerates of spindle-shaped magnetic metal particles had an average particle diameter of 650 μm (maximum particle diameter: 1500 μm), and a repose angle of 40°, a bulk density of 0.57 g/ml, a tap density of 0.66 g/ml and a compaction percentage of 14%. The changes in amounts of repose angle and bulk density between before and after deaggregating the granulated product, were +1° and +0.01 g/ml, respectively. This indicated that almost no change was caused with respect to the repose angle and bulk density. Also, the content of particles having a size of not more than 53 μm was 2.4%.

As a result of the evaluation of the obtained secondary agglomerates of spindle-shaped magnetic metal particles, it was confirmed that the gloss thereof was Rank 3; the elongation thereof was Rank 3; and the flexibility thereof was Rank 3.

Further, as to sheet magnetic characteristics of the secondary agglomerates of spindle-shaped magnetic metal particles, when the dilution-dispersing time was 2 hours, the sheet 45° gloss was 147%; the sheet squareness (Br/Bm) was 0.828; the sheet orientation property (OR) was 2.58; the sheet SFD was 0.519; and the sheet coercive force Hc was 115.8 kA/m (1455 Oe). Also, when the dilution-dispersing time was 4 hours, the sheet 45° gloss was 168%; the sheet squareness (Br/Bm) was 0.846; the sheet orientation property (OR) was 2.75; the sheet SFD was 0.505; and the sheet coercive force Hc was 114.7 kA/m (1441 Oe). In addition, when the dilution-dispersing time was 6 hours, the sheet 45° gloss was 177%; the sheet squareness (Br/Bm) was 0.855; the sheet orientation property (OR) was 2.88; the sheet SFD was 0.500; the sheet coercive force Hc was 114.6 kA/m (1440 Oe); and ΔBm was 3.4% (measured value: −3.4%).

Examples 6 and 7 and Comparative Examples 1 and 2

The same procedure as defined in Example 1 was conducted using the granulated product of magnetic metal particles except that deaggregating conditions were changed variously, thereby obtaining secondary agglomerates of magnetic metal particles. Meanwhile, in Comparative Example 1, the granulated product of magnetic metal particles was not deaggregated.

Production conditions and various properties of the obtained secondary agglomerates of magnetic metal particles are shown in Table 1.

Comparative Example 3: Follow-up Test of Japanese Patent Publication (KOKOKU) No. 7-62900(1995)

The granulated product of magnetic metal particles obtained in Example 1 was compacted at a linear load of 20 kgf/cm² for 10 minutes using a sand mill "MPUN-2 Model" manufactured by Matsumoto Chuzo Co., Ltd.

Various properties of the obtained magnetic metal particles are shown in Table 1.

Production Examples 1 and 2 and Comparative Production Examples 1 to 3

The same procedure as defined in Example 1 was conducted except that the magnetic metal particles obtained in Examples 6 and 7 and Comparative Examples 1 to 3 were used, thereby producing a magnetic coating film.

Various properties of the obtained magnetic coating film are shown in Tables 2 and 3.

The secondary agglomerates of magnetic metal particles obtained by compacting the particles in Comparative Example 3, exhibited high repose angle and compaction degree as well as low flowability, as shown in Table 1, and were further deteriorated in kneading property and dispersibility as shown in Table 2 and 3. It was considered that the deteriorated properties of the magnetic coating film were caused by shape breakage of primary particles due to the compaction treatment.

Example 8

<Production of Magnetic Recording Medium>

100 parts by weight of the secondary agglomerates of magnetic metal particles obtained in Example 1, 10.0 parts by weight of a vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black particles (produced by Mitsubishi Chemical Corp., average particle size: 26 nm; BET specific surface area: 130 m²/g) and 7.0 parts by weight of alumina particles "AKP-30" (tradename, produced by Sumitomo Kagaku Co., Ltd., average particle size: 0.4 μm) were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts by weight (solid content) of a polyurethane resin (tradename: E-900, produced by Takeda Yakuhin Kogyo Co., Ltd.) in a mixed solvent containing methyl ethyl ketone and toluene at a mixing ratio of 1:1, and the resultant mixture was mixed and dispersed for 30 minutes by a sand grinder. Thereafter, the obtained dispersion was passed through a filter having a mesh size of 1 μm. The obtained filter cake was mixed under stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone at a mixing ratio (weight) of 5:3:2, and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone at a mixing ratio (weight) of 5:3:2, thereby producing a magnetic coating composition.

The obtained magnetic coating composition contained the following components:

| | |
|---|---|
| Spindle-shaped magnetic metal particles | 100 weight parts |
| Vinyl chloride-vinyl acetate copolymer resin | 10 weight parts |
| Polyurethane resin | 10 weight parts |
| Alumina particles | 7.0 weight parts |
| Carbon black fine particles | 1.0 weight part |
| Myristic acid | 1.0 weight part |
| Butyl stearate | 3.0 weight parts |
| Trifunctional low molecular weight polyisocyanate | 5.0 weight parts |
| Cyclohexanone | 56.6 weight parts |
| Methyl ethyl ketone | 141.5 weight parts |
| Toluene | 85.4 weight parts |

The obtained magnetic coating composition had a viscosity of 5,660 cP.

The thus obtained magnetic coating composition was passed through a filter having a mesh size of 1 μm Thereafter, the magnetic coating composition was coated on a 12 μm-thick polyester base film using a slit coater having a gap width of 45 μm and then dried, thereby forming a magnetic layer on the base film. The surface of the obtained magnetic recording layer was calendered and smoothened by an ordinary method, and then the film was cut into a width of ½ inch (1.27 cm). The obtained tape was allowed to stand in a curing oven maintained at 60° C., for 24 hours to sufficiently cure the magnetic recording layer therein, thereby producing a magnetic tape. The obtained coating layer had a thickness of 3.5 μm.

With respect to magnetic properties of the obtained magnetic tape, the coercive force value thereof was 131.1 kA/m (1648 Oe); the gloss thereof was 220%; the squareness (Br/Bm) thereof was 0.889; the sheet orientation property (OR) was 3.80; the sheet SFD was 0.444; and ΔBm was 3.4% as an absolute value (measured value: −3.4%).

Examples 9 and 12

The same procedure as defined in Example 8 was conducted except using the secondary agglomerates of magnetic metal particles obtained in Examples 2 to 5, thereby obtaining magnetic recording media.

Various properties of the obtained magnetic recording media are shown in Table 4.

TABLE 1

| Examples and Comparative Examples | Kind of granulated product | Deaggregation treatment | |
|---|---|---|---|
| | | Sizing or grating condition | |
| | | Kind of screen | Mesh size of screen |
| Example 6 | Granulate product obtained in Example 1 | Punching-type | 2.0 |
| Example 7 | Granulate product obtained in Example 1 | Mesh-type | 1.0 |
| Comparative Example 1 | Granulate product obtained in Example 1 | — | — |
| Comparative Example 2 | Granulate product obtained in Example 1 | Punching-type | 0.5 |
| Comparative Example 3 | Granulate product obtained in Example 1 | Compaction treatment | |

TABLE 1-continued

| | Various properties of secondary agglomerates of magnetic metal particles | | |
|---|---|---|---|
| Examples and Comparative Examples | Average particle size (μm) | Upper limit of particle size (μm) | Repose angle (°) |
| Example 6 | 750 | 2,000 | 40 |
| Example 7 | 500 | 1,000 | 42 |
| Comparative Example 1 | 3,000 | 5,000 | 40 |
| Comparative Example 2 | 50 | 500 | 46 |
| Comparative Example 3 | 50 | 100 | 47 |

| | Various properties of secondary agglomerates of magnetic metal particles | | |
|---|---|---|---|
| Examples and Comparative Examples | Bulk density (g/ml) | Tap density (g/ml) | Compaction percentage (%) |
| Example 6 | 0.58 | 0.66 | 12 |
| Example 7 | 0.58 | 0.68 | 13 |
| Comparative Example 1 | 0.57 | 0.64 | 11 |
| Comparative Example 2 | 0.49 | 0.68 | 28 |
| Comparative Example 3 | 0.60 | 0.73 | 18 |

TABLE 2

| Examples and Comparative Examples | | Conditions of kneaded material | | |
|---|---|---|---|---|
| | Kind | Gloss | Elongation | Flexibility |
| Production Example 1 | Example 6 | 3 | 2 | 3 |
| Production Example 2 | Example 7 | 3 | 3 | 3 |
| Comparative Production Example 1 | Comparative Example 1 | 1 | 1 | 1 |
| Comparative Production Example 2 | Comparative Example 2 | 2 | 3 | 2 |
| Comparative Production Example 3 | Comparative Example 3 | 1 | 1 | 1 |

| | Properties of magnetic coating film (dispersing time: 2 hours; orientation magnetic field: 5 kOe) | | |
|---|---|---|---|
| Examples and Comparative Examples | 45° gloss (%) | Coercive force Hc | |
| | | (kA/m) | (Oe) |
| Production Example 1 | 158 | 129.2 | 1,623 |
| Production Example 2 | 160 | 129.7 | 1,630 |

TABLE 2-continued

| | | | |
|---|---|---|---|
| Comparative Production Example 1 | 148 | 128.0 | 1,609 |
| Comparative Production Example 2 | 160 | 129.6 | 1,628 |
| Comparative Production Example 3 | 141 | 127.0 | 1,596 |

| | Properties of magnetic coating film (dispersing time: 2 hours; orientation magnetic field: 5 kOe) | | |
|---|---|---|---|
| Examples and Comparative Examples | Squareness (Br/Bm) | OR | SFD |
| Production Example 1 | 0.812 | 2.44 | 0.532 |
| Production Example 2 | 0.813 | 2.48 | 0.529 |
| Comparative Production Example 1 | 0.798 | 2.26 | 0.536 |
| Comparative Production Example 2 | 0.815 | 2.48 | 0.529 |
| Comparative Production Example 3 | 0.791 | 2.14 | 0.542 |

TABLE 3

| | Properties of magnetic coating film (dispersing time: 4 hours; orientation magnetic field: 5 kOe) | | |
|---|---|---|---|
| Examples and Comparative Examples | 45° gloss (%) | Coercive force Hc (kA/m) | (Oe) |
| Production Example 1 | 174 | 128.7 | 1,617 |
| Production Example 2 | 177 | 128.6 | 1,616 |
| Comparative Production Example 1 | 160 | 128.4 | 1,614 |
| Comparative Production Example 2 | 178 | 129.2 | 1,621 |
| Comparative Production Example 3 | 155 | 126.9 | 1,595 |

| | Properties of magnetic coating film (dispersing time: 4 hours; orientation magnetic field: 5 kOe) | | |
|---|---|---|---|
| Examples and Comparative Examples | Squareness (Br/Bm) | OR | SFD |
| Production Example 1 | 0.827 | 2.60 | 0.520 |
| Production Example 2 | 0.830 | 2.65 | 0.517 |
| Comparative Production Example 1 | 0.819 | 2.48 | 0.525 |
| Comparative Production Example 2 | 0.827 | 2.64 | 0.518 |
| Comparative Production Example 3 | 0.813 | 2.37 | 0.529 |

TABLE 3-continued

| | Properties of magnetic coating film (dispersing time: 6 hours; orientation magnetic field: 5 kOe) | | |
|---|---|---|---|
| Examples and Comparative Examples | 45° gloss (%) | Coercive force Hc (kA/m) | (Oe) |
| Production Example 1 | 178 | 128.9 | 1,620 |
| Production Example 2 | 183 | 128.7 | 1,617 |
| Comparative Production Example 1 | 168 | 127.6 | 1,603 |
| Comparative Production Example 2 | 181 | 129.2 | 1,624 |
| Comparative Production Example 3 | 162 | 126.5 | 1,590 |

| | Properties of magnetic coating film (dispersing time: 6 hours; orientation magnetic field: 5 kOe) | | |
|---|---|---|---|
| Examples and Comparative Examples | Squareness (Br/Bm) | OR | SFD |
| Production Example 1 | 0.833 | 2.71 | 0.513 |
| Production Example 2 | 0.837 | 2.75 | 0.510 |
| Comparative Production Example 1 | 0.829 | 2.64 | 0.517 |
| Comparative Production Example 2 | 0.836 | 2.75 | 0.512 |
| Comparative Production Example 3 | 0.823 | 2.54 | 0.521 |

TABLE 4

| | Production of magnetic coating composition | | | |
|---|---|---|---|---|
| Examples and Comparative Examples | Kind of secondary agglomerates of magnetic metal particles | Weight ratio of particles to resin (-) | Amount of abrasive added (part by weight) | Properties of magnetic coating composition Viscosity (cP) |
| Example 8 | Example 1 | 5.0:1 | 7.0 | 5,660 |
| Example 9 | Example 2 | 5.0:1 | 7.0 | 5,610 |
| Example 10 | Example 3 | 5.0:1 | 7.0 | 5,540 |
| Example 11 | Example 4 | 5.0:1 | 7.0 | 5,500 |
| Example 12 | Example 5 | 5.0:1 | 7.0 | 5,530 |

| | Properties of magnetic recording medium | | | |
|---|---|---|---|---|
| Examples and Comparative Examples | Thickness of magnetic layer (μm) | Coercive force value (kA/m) | (Oe) | Squareness (Br/Bm) (-) |
| Example 8 | 3.5 | 131.1 | 1,648 | 0.889 |
| Example 9 | 3.5 | 131.5 | 1,653 | 0.892 |
| Example 10 | 3.5 | 131.9 | 1,658 | 0.889 |
| Example 11 | 3.5 | 116.6 | 1,465 | 0.902 |
| Example 12 | 3.5 | 115.2 | 1,448 | 0.900 |

TABLE 4-continued

| Examples and Comparative Examples | Properties of magnetic recording medium | |
|---|---|---|
| | 45° Gloss (%) | Sheet orientation property (-) |
| Example 8 | 220 | 3.80 |
| Example 9 | 235 | 3.85 |
| Example 10 | 217 | 3.79 |
| Example 11 | 192 | 4.02 |
| Example 12 | 189 | 4.01 |

| Examples and Comparative Examples | Properties of magnetic recording medium | |
|---|---|---|
| | Sheet SFD (-) | ABm (%) |
| Example 8 | 0.444 | 3.4 |
| Example 9 | 0.440 | 4.0 |
| Example 10 | 0.450 | 2.7 |
| Example 11 | 0.433 | 2.7 |
| Example 12 | 0.437 | 2.9 |

What is claimed is:

1. Secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm and a repose angle of 38 to 45°, and the amount of the secondary agglomerates having a diameter of not more than 53 μm is more than 30% by weight.

2. Secondary agglomerates of magnetic metal particles according to claim 1, which further have a bulk density of 0.35 to 0.65 g/ml, a tap density of 0.39 to 0.75 g/ml and a compaction percentage of 10 to 15%.

3. Secondary agglomerates of magnetic metal particles according to claim 1, wherein said primary particles of the magnetic metal particles constituting the secondary agglomerates are acicular magnetic metal particles having an average major axial diameter of 0.05 to 0.25 μm, an aspect ratio of 4:1 to 13:1 and a BET specific surface area of 35 to 65 m²/g.

4. Secondary agglomerates of magnetic metal particles according to claim 1, wherein said primary particles of the magnetic metal particles constituting the secondary agglomerates are spindle-shaped magnetic metal particles containing iron as a main component, having an average major axial diameter of 0.05 to 0.15 μm, an aspect ratio of 5:1 to 9:1, a size distribution (standard deviation/average major axial diameter) of not more than 0.30, a crystallite size $D_{110}$ of 130 to 160 Å, a Co content of from 0.5 to less than 6 atm% based on whole Fe, an Al content of from more than 10 to less than 20 atm% based on whole Fe, a rare earth content of 1.5 to 5 atm% based on whole Fe, an atomic ratio of Al to Co of from more than 2 to 4, a coercive force of 111.4 to 143.2 kA/m, an oxidation stability (Aas) of saturation magnetization of not more than 10%, and an ignition temperature of not less than 130° C.

5. Secondary agglomerates of magnetic metal particles according to claim 1, wherein said primary particles of the magnetic metal particles constituting the secondary agglomerates are spindle-shaped magnetic metal particles containing iron as a main component, having an average major axial diameter (L) of 0.05 to 0.15 μm; a coercive force of 111.4 to 143.2 kA/m; a Co content of from 0.5 to less than 5 atm% based on whole Fe; a crystallite size of from 150 to less than 170 Å; a specific surface area (S) represented by the formula:

$S < -160 \times L + 65$;

an oxidation stability (Δσs) of saturation magnetization of not more than 5%; and an ignition temperature of not less than 140° C.

6. Secondary agglomerates of magnetic metal particles according to claim 1, wherein said primary particles of the magnetic metal particles constituting the secondary agglomerates are spindle-shaped magnetic metal particles containing iron as a main component, having a Co content of from 0.5 to less than 10 atm% based on whole Fe, an Al content of from 5 to 10 atm% based on whole Fe, a rare earth content of from 1 to 5 atm% based on whole Fe, an atomic ratio of Al to rare earth element of 1.5 to 5, calculated as atm% of the respective elements based on Fe, an average major axial length of 0.05 to 0.25 μm, a size distribution (standard deviation/major axial length) of not more than 0.26, an average minor axial length of 0.015 to 0.025 μm, an average aspect ratio of 5:1 to 9:1, a specific surface area of 30 to 60 m²/g, an ignition temperature of not less than 145° C., an oxidation stability of not more than 6%, and a coercive force of 103.5 to 143.2 kA/m.

7. Secondary agglomerates of magnetic metal particles according to claim 1, wherein said primary particles of the magnetic metal particles constituting the secondary agglomerates are spindle-shaped magnetic metal particles containing iron as a main component, having a Co content of from 0.5 to less than 10 atm% based on whole Fe, an Al content of 5 to 10 atm% based on whole Fe, a rare earth content of 1 to 5 atm% based on whole Fe, an atomic ratio of Al to rare earth element of 1.5 to 5, calculated as atm% of the respective elements based on Fe, an average major axial length of 0.15 to 0.25 μm, a size distribution (standard deviation/major axial length) of not more than 0.30, an average minor axial length of 0.015 to 0.025 μm, an average aspect ratio of 5:1 to 9:1, a specific surface area of 30 to 60 m²/g, an ignition temperature of not less than 135° C., an oxidation stability of not more than 10%, and a coercive force of 103.5 to 143.2 kA/m.

8. Secondary agglomerates of magnetic metal particles comprising magnetic metal primary particles having an average major axial diameter of 0.05 to 0.25 μm, said secondary agglomerates having an average particle diameter of 300 to 800 μm, an upper limit of particle diameter of 2,000 μm, a repose angle of 38 to 45° the amount of the secondary agglomerates having a diameter of not more than 53 μm is not more than 30% by weight a bulk density of 0.35 to 0.65 g/ml, a tap density of 0.39 to 0.75 g/ml and a compaction percentage of 10 to 15%.

9. A magnetic recording medium comprising a non-magnetic substrate and a magnetic recording layer formed on the non-magnetic substrate comprising a binder resin and magnetic metal particles containing iron as a main component which are derived from secondary agglomerates of magnetic metal particles containing primary particles having an average major axial diameter of 0.05 to 0.25 μm, said secondary agglomerates having an average particle diameter of 300 to 800 μm, an upper limit of particle diameter of 2,000 μm a repose angle of 38 to 45°°, and the amount of the secondary agglomerates having a diameter of not more than 53 μm is not more than 30% by weight.

10. A magnetic recording medium according to claim 9, which further has a coercive force value of 111.4 to 143.2 kA/m, and when the magnetic coating film is oriented by applying a magnetic field of 397.9 kA/m thereto, a squareness (Br/Bm) of not less than 0.84, an orientation property (OR) of usually not less than 2.8, a coercive force distribution (Switching Field Distribution) of not more than 0.53 and an oxidation stability (ΔBm) of not more than 8.0%.

* * * * *